United States Patent [19]

Tsukagoshi

[11] Patent Number: 5,742,352

[45] Date of Patent: Apr. 21, 1998

[54] VIDEO CAPTION DATA DECODING DEVICE

[75] Inventor: Ikuo Tsukagoshi, Tokyo, Japan

[73] Assignee: Sony Corporation, Tokyo, Japan

[21] Appl. No.: 608,941

[22] Filed: Feb. 29, 1996

Related U.S. Application Data

[63] Continuation of Ser. No. 365,620, Dec. 28, 1994, abandoned.

[30] Foreign Application Priority Data

Dec. 28, 1993 [JP] Japan ................... 5-334278

[51] Int. Cl.⁶ .................. H04N 7/08; H04N 7/087
[52] U.S. Cl. ................. 348/468; 348/564; 348/461
[58] Field of Search ................... 348/467, 468, 348/465, 463, 461, 460, 466, 478, 589, 590, 597, 600, 599, 584, 578, 588, 564, 555, 556, 557, 580, 445; 358/335; H04N 7/087, 7/08

[56] References Cited

U.S. PATENT DOCUMENTS 4,605,964  8/1986  Chard ...................... 348/461
5,016,113  5/1991  Yamashita et al. ........ 358/335
5,065,252  11/1991 Yoshio et al. ............. 358/335
5,097,349  3/1992  Nomura et al. ........... 358/335
5,294,982  3/1994  Salomon et al. .......... 348/476
5,298,995  3/1994  Monta et al. ............. 348/589
5,299,006  3/1994  Kim ........................ 348/473
5,355,170  10/1994 Eitz et al. ................. 348/466
5,519,443  5/1996  Salomon et al. .......... 348/467

OTHER PUBLICATIONS

"TELETEXT SPECIFICATION", Interim Technical Document SPB492, european broadcasting union, Dec. 1992, Geneva, pp. 1–140.
"CCD 3000/LN21 One–Chip Closed Caption Decoder" ITT Semiconductor Specs., Aug. 17, 1990, pp. 1–40.

*Primary Examiner*—Glenton B. Burgess
*Attorney, Agent, or Firm*—Limbach & Limbach L.L.P.

[57] ABSTRACT

The specification relates to a caption data decoder device which incorporates circuitry for extracting and decoding caption data from a transmitted video signal. Processing circuitry is provided for processing caption data so that caption data may be simultaneously displayed on a display device, in a superimposed fashion, along with associated video imagery.

6 Claims, 17 Drawing Sheets

Subtitle data stream packet stucture

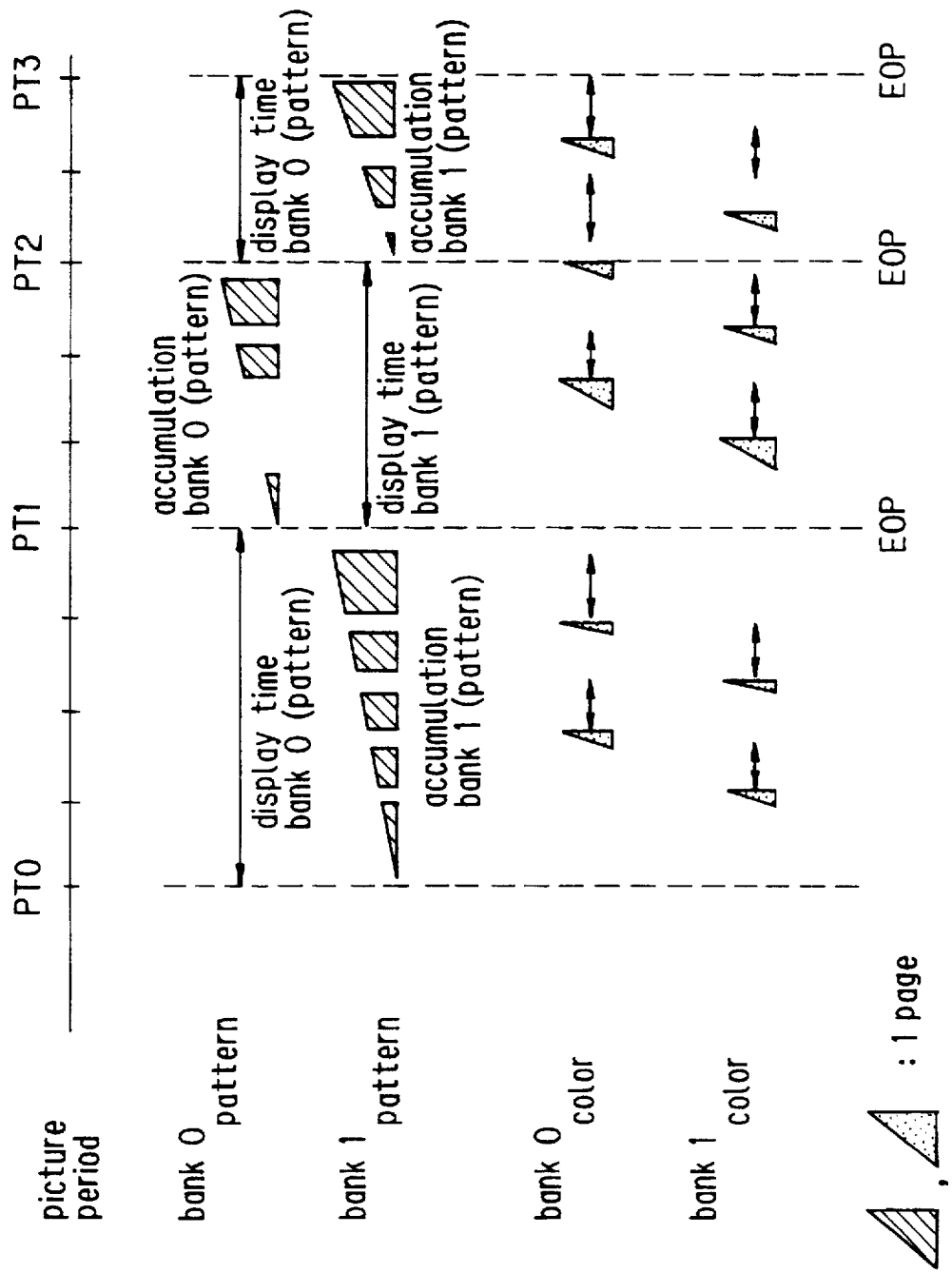

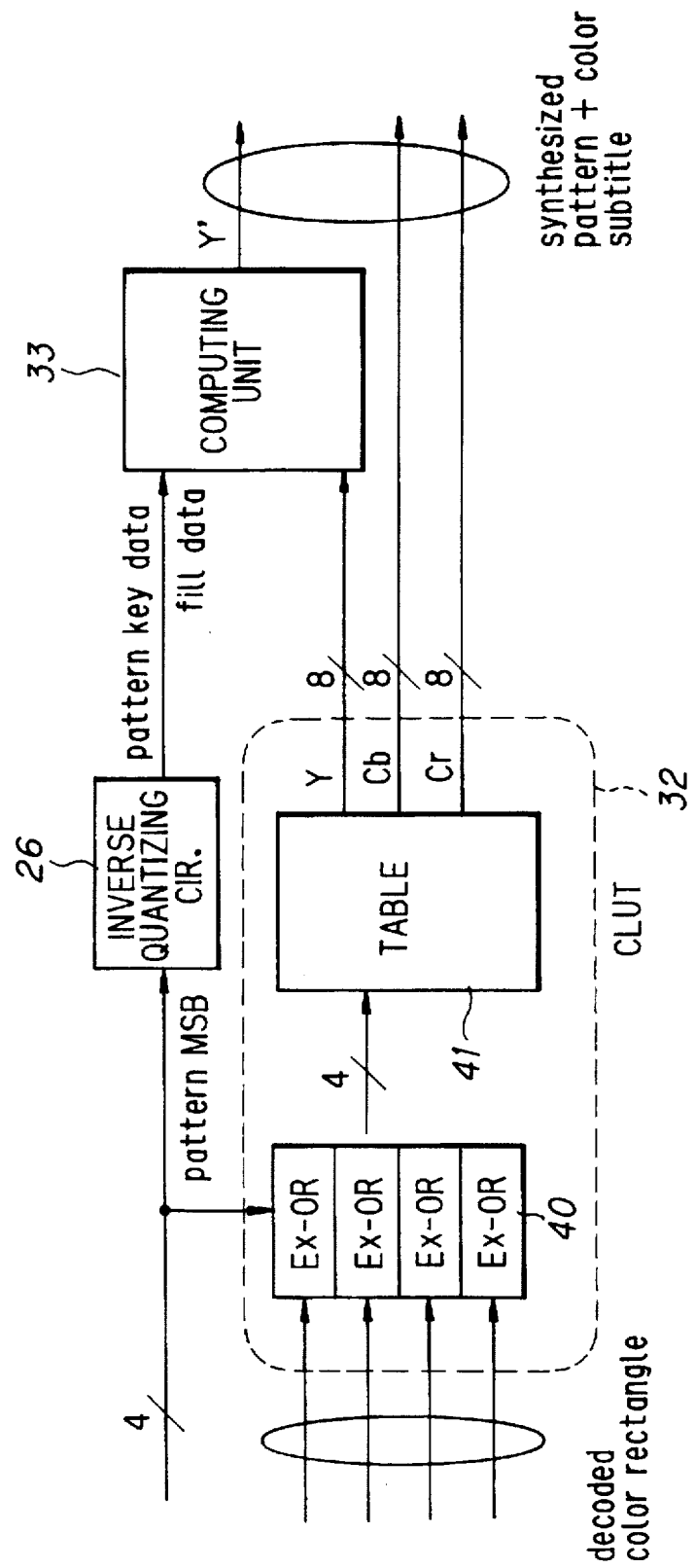

FIG. 10a pattern

FIG. 10b color n_th frame

FIG. 10c switched CLUT

FIG. 10d synthesized pattern+color subtitle picture frame rate (30Hz or 25Hz)

decode start timing frame n frame n+1 frame n+2

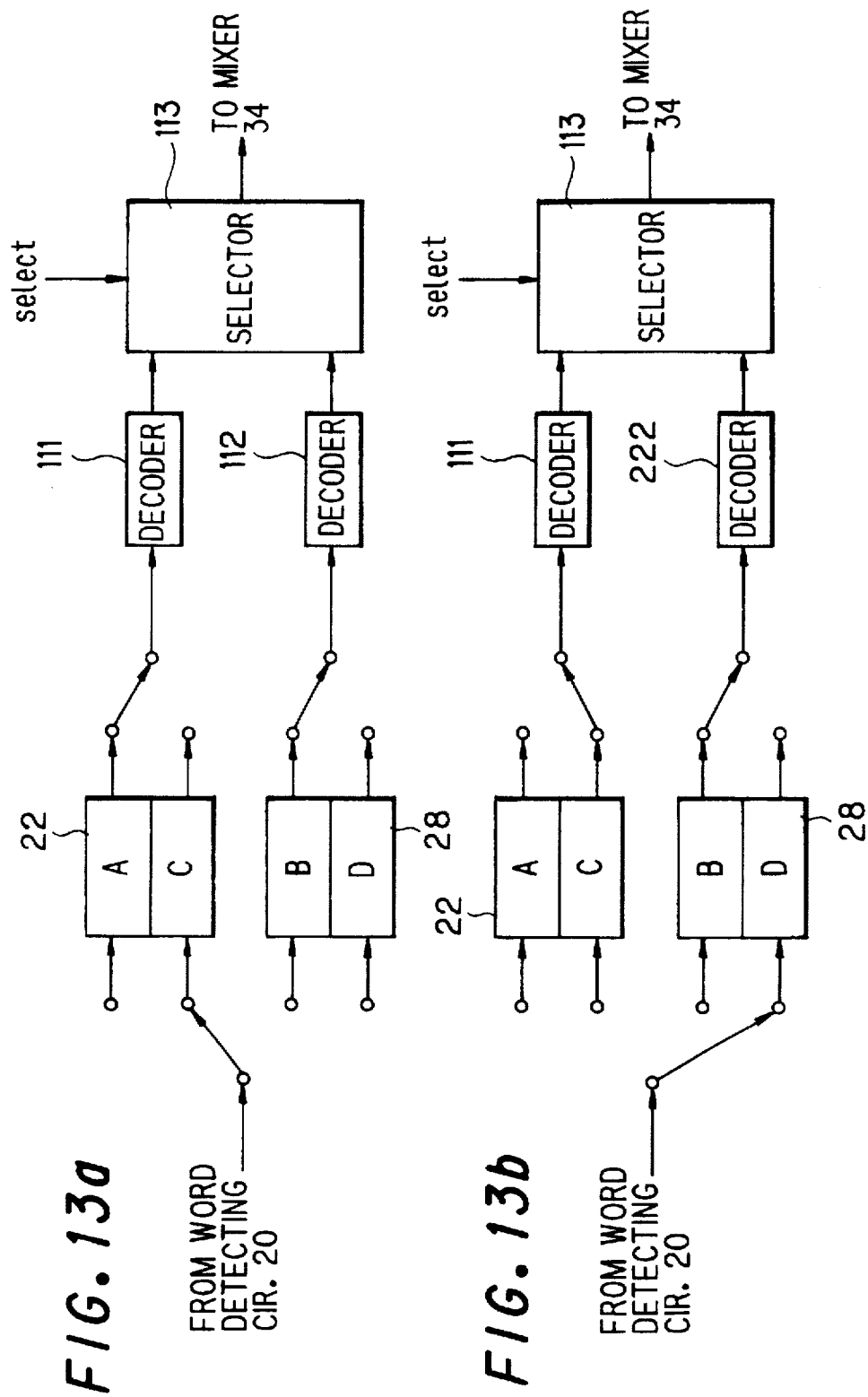

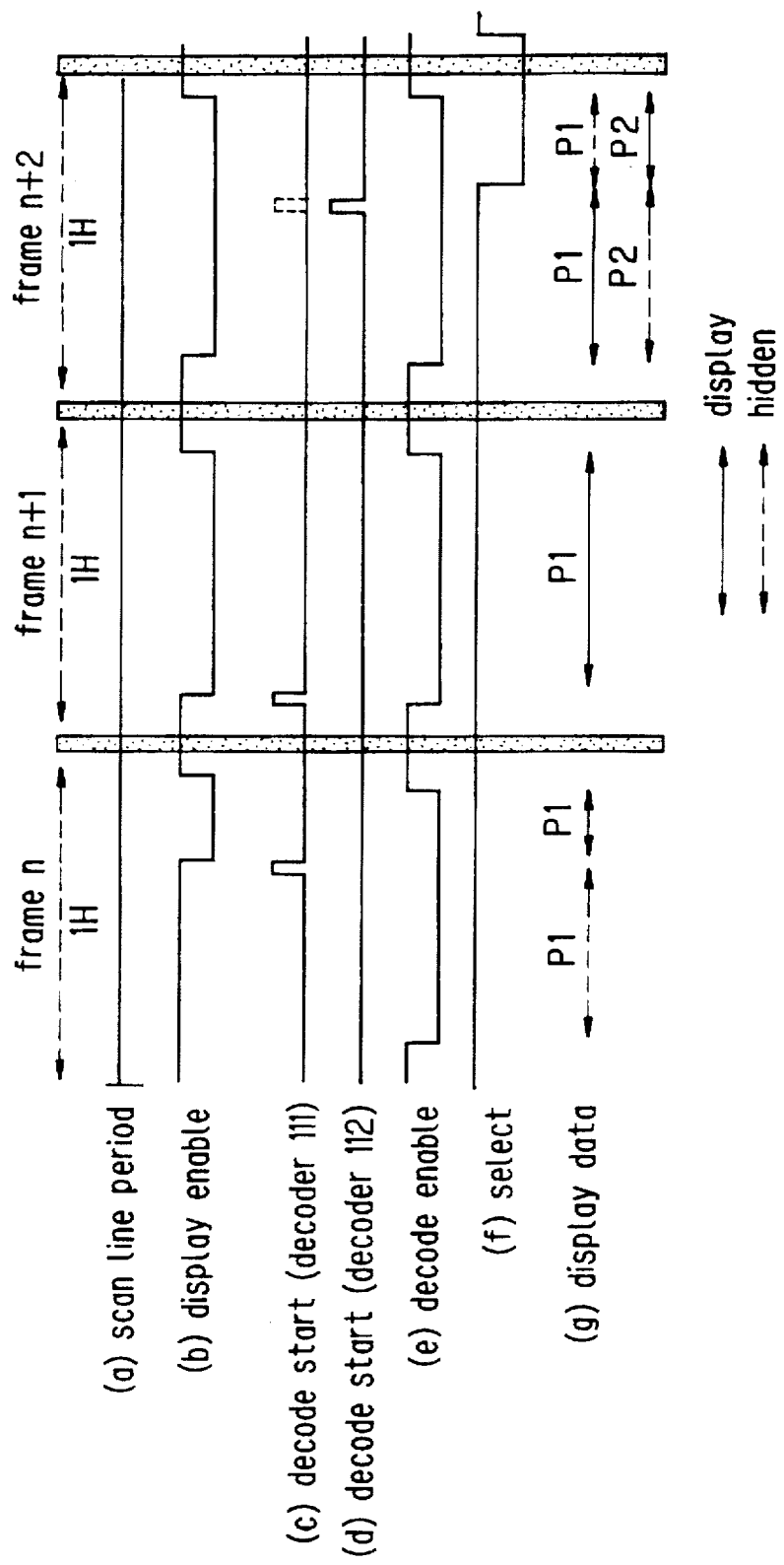

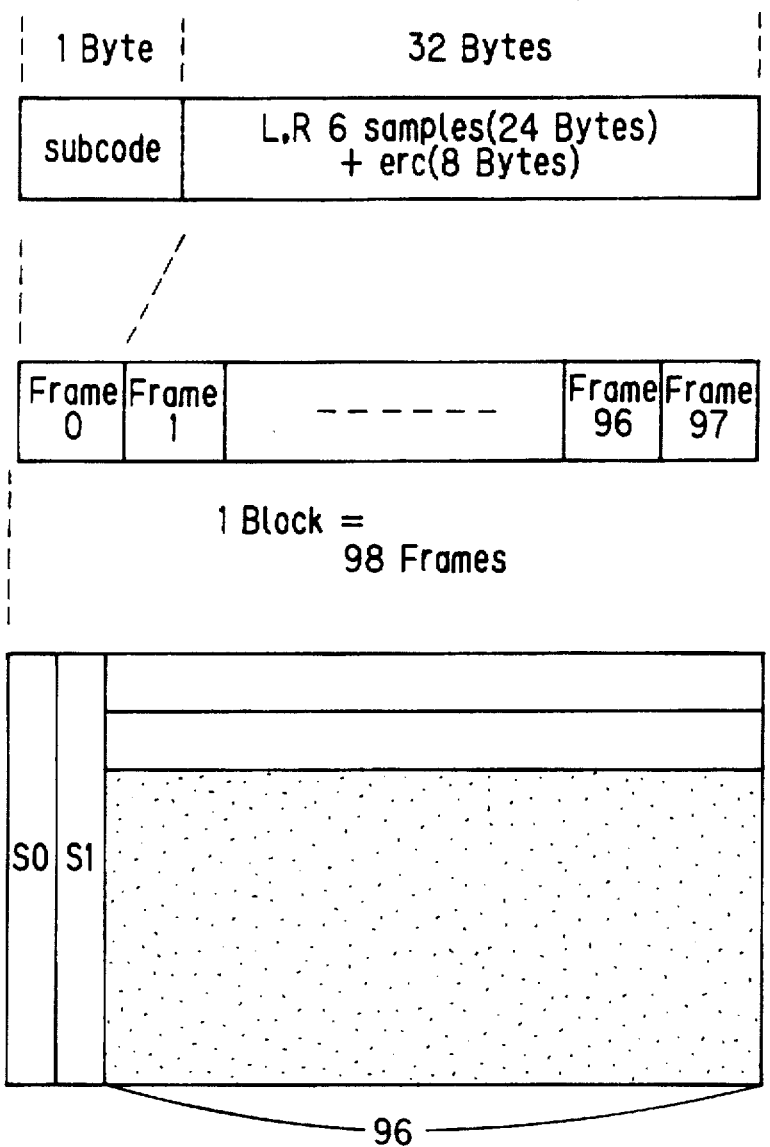

VIDEO CAPTION DATA DECODING DEVICE

This is a continuation application of application Ser. No. 08/365,620 filed on Dec. 28, 1994, now abandoned.

FIELD OF THE INVENTION

The present invention relates to a caption data decoding device suitable for use in decoding data representing captions to be displayed in a superimposed fashion on a video image.

BACKGROUND OF THE INVENTION

Typically, when a foreign movie or the like is presented in Japan, it is commonly performed that textual captions are superimposed on the display screen along with movie imagery. In video disc players, ordinary television broadcasts, and the like, a video signal is transmitted with textual or graphic captions superimposed on a video image in advance.

In commonly known systems such as the CAPTAIN system or CD-G system, for instance, captions can be transmitted as character codes or dot patterns. Further, in CD-G, graphics can be recorded by using subcodes. Using this function, it is possible to record captions on a CD.

In CD-G, as shown in FIG. 16, 1-frame data consists of a subcode of 1 byte and data of 32 bytes. Of the data of 32 bytes, 6-sample data (2 bytes per sample) is allocated to each of the L-channel and R-channel, totaling 24 bytes. An error, correction code of 8 bytes is added to this audio data of 24 bytes, thus constituting the data of 32 bytes in total.

On the other hand, subcodes of 98 frames are collected to constitute one block. Of the subcodes of 98 frames, subcodes of the first two frames of a block are made of sync patterns of S0 and S1. Various subcode data can be allocated to the remaining subcodes of 96 frames. However, data for track search has already been allocated to a P-channel and a Q-channel of each 1-byte subcode (respective bits are represented by P-W). Graphics data can be allocated to the remaining 6 bits, i.e., the R-channel to the W-channel. That is, graphics data can actually be allocated to a region of 6×96 bits.

Since 1-block data is transmitted at a frequency of 75 Hz, the transfer rate of 1-frame data is 75×98 Hz. Therefore, the transmission bit rate of subcodes is 7.35 kilobytes/s.

FIG. 17 shows a transmission format of such graphics data. As shown in FIG. 17, one packet is constituted of data of 96 symbols each consisting of 6-bit data of the R-channel to the W-channel. In other words, each packet is constituted of 4 packs each consisting of 24 symbols, i.e., symbol 0 to symbol 23. Mode information is allocated to 3 bits R, S and T of symbol 0, and item information is allocated to the remaining 3 bits U, V and W. The following modes are specified by combinations of the mode information (MODE) and the item information (ITEM):

| MODE | ITEM | |
|------|------|------|
| 000 | 000 | 0 mode |
| 001 | 000 | Graphics mode |
| 001 | 001 | TV-graphics mode |
| 111 | 000 | User mode |

An instruction is allocated to symbol 1, and a parity for the mode and item information and the instruction is allocated to symbols 2 and 3. Therefore, graphics data can actually be allocated to a region of symbol 4 to symbol 19. For example, graphics data is allocated to 12 symbols shown in FIG. 17. A parity for 20 symbols from symbol 0 to symbol 19 is allocated to 4 symbols from symbol 20 to symbol 23.

In the above manner, in CD-G, graphics data can be allocated as binary data to a region of 6×12 pixels of each pack. Since packs are transmitted at a rate of 75×4=300 packs/s, 300 characters can be transmitted per second if one character is allocated to the region of 6×12 pixels.

Since one picture prescribed in CD-G consists of 288 horizontal pixels ×192 lines, it takes 2.56 seconds to transmit characters of one pixel as calculated below:

$$(288/6) \times (192/12)/300 \ 2.56$$

Further, to express each pixel in 16 values, four different patterns need to be transmitted for one character pattern. Therefore, the above value should be multiplied by 4 to become 10.24 seconds.

By the way, among the conventional schemes, the scheme in which captions are transmitted being superimposed on video images as in video disc players and ordinary television broadcasts has a problem that a user cannot switch on or off the display of captions according to his desire. Further, a user cannot select among plural kinds of captions prepared in different languages.

On the other hand, while the schemes of CAPTAIN and CD-G allow a user to switch on or off the display of captions according to his desire, they cannot provide sufficiently high resolution.

The one-picture resolution of the CAPTAIN system, 248 horizontal pixels ×192 lines is not sufficient in view of that of the component digital TV signal, 720 horizontal pixels ×480 lines.

In CD-G, only 1-bit data can be allocated to 1 pixel and, therefore, data is represented by a binary form. This causes several undesirable phenomena uncomfortable to a user, such as aliasing in which an inclined line of a character is zigzagged and flickering in which characters flicker.

Although it may be conceivable to convert binary information to multi-valued information by using filters, for instance, such filters need to be very precise and are therefore expensive. Further, such filters will deteriorate the quality of background images.

Further, if it is attempted to represent 1 pixel by 16 values in CD-G, it takes about four times the time required in the case where 1 pixel is represented in a binary form (described above). This makes it difficult to perform switching of the display of captions at high speed.

Further, in the CAPTAIN system and CD-G, the slow data transmission rate disables display of captions that change dynamically in time, for instance, scrolling of captions.

SUMMARY OF THE INVENTION

The present invention has been made in view of the above circumstances, and has as an object, making it possible to display high-quality captions in a user's desired form.

Another object of the invention is to enable high-speed switching of displays of captions without deteriorating background video images.

A further object of the invention is to enable display of captions that change dynamically in time with a small data amount.

A video subtitle processing system is shown, for example, in U.S. application Ser. No. 08/360,095, by Ikuo Tsukagoshi, filed on Dec. 20, 1994, the disclosure of which is hereby incorporated by reference.

According to a first aspect of the invention, a caption data decoding device for decoding data of a caption to be displayed being superimposed on a video image, comprises a demultiplexer 1 as separating means for separating the caption data from transmission data; a code buffer 22 (or 28) as storing means including at least three banks, for temporarily storing the caption data sequentially output from the demultiplexer 1; decoders 111 and 112 as first and second decoding means for decoding the caption data stored in the code buffer 22; and a selector 113 as selecting means for selecting and outputting either of decoded outputs of the decoders 111 and 112, wherein the code buffer 22 sequentially stores the caption data supplied from the demultiplexer 1 into the respective banks on a page-by-page basis; the decoders 111 and 112 read and decode respective caption data of consecutive two pages of the caption data stored in the code buffer 22 at a timing delayed by a prescribed period from a horizontal sync signal timing of the video image; and the selector 113 switches decoded caption data to be output at a prescribed timing in one horizontal scanning line period of the video image.

According to a second aspect of the invention, a caption data decoding device for decoding data of a caption to be displayed being superimposed on a video image, comprises a demultiplexer 1 as separating means for separating the caption data from transmission data; code buffers 22 and 28 as first and second storing means each including two banks, for temporarily storing the caption data sequentially output from the demultiplexer 1; decoders 111 and 112 as first and second decoding means for decoding the caption data stored in the code buffers 22 and 28, respectively; and a selector 113 as selecting means for selecting and outputting either of decoded outputs of the first and second decoding means, wherein the code buffers 22 and 28 alternately stores the caption data supplied from the demultiplexer 1 on a page-by-page basis; the decoders 111 and 112 read and decode respective caption data of consecutive two pages of the caption data stored in the code buffers 22 and 28 at a timing delayed by a prescribed period from a horizontal sync signal timing of the video image; and the selector 113 switches decoded caption data to be output at a prescribed timing in one horizontal scanning line period of the video image.

In the caption data decoding device according to the first aspect of the invention, caption data supplied from the demultiplexer 1 are sequentially stored into the respective banks of the code buffer 22 on a page-by-page basis. Respective caption data of consecutive two pages of the caption data stored in the code buffer 22 are read and decoded by the decoders 111 and 112 at a timing delayed by a prescribed period from a horizontal sync signal timing of a video image. Either of those caption data is selected and output at a prescribed timing in one horizontal scanning line period of the video image. Therefore, captions can be scrolled using only the caption data of respective pages, i.e., without using caption data for intermediate positions of scrolling in each frame or field.

In the caption data decoding device according to the second aspect of the invention, caption data supplied from the demultiplexer 1 are alternately stored into the code buffers 22 and 28 on a page-by-page basis. Respective caption data of consecutive two pages of the caption data stored in the code buffers 22 and 28 are read and decoded by the decoders 111 and 112 at a timing delayed by a prescribed period from a horizontal sync signal timing of a video image. Either of those caption data is selected and output at a prescribed timing in one horizontal scanning line period of the video image. Therefore, captions can be scrolled using only the caption data of respective pages, i.e., without using caption data for intermediate positions of scrolling in each frame or field.

In another embodiment of the present invention there is provided a caption data decoding device which includes a receiving means for receiving an input signal which is composed of video transmission data, caption data and timing data. There is also included a separating means for separating caption data from video transmission data and timing data and for sequentially outputting it; a storage means for storing the caption data output from the separating means; a first and second decoder for decoding caption data; and an output means for selectively outputting the decoded caption data from the first and second decoders in synchronization with the timing data.

BRIEF DESCRIPTION OF THE DRAWINGS

FIG. 8 illustrates an operation of a code buffer 22 (and a code buffer 28) shown in FIG. 7;

FIG. 9 shows an example of a configuration of a color look-up table;

FIGS. 10(a)–10(d) illustrate an operation of the color look-up table;

FIGS. 13(a) and 13(b) are block diagrams showing a configuration of a first embodiment of a caption decoding device according to the invention;

FIG. 14 is a timing chart showing an operation of one embodiment of the present invention;

FIG. 16 illustrates a conventional format of subcodes; and

DESCRIPTION OF THE PREFERRED EMBODIMENTS

Figure 1:
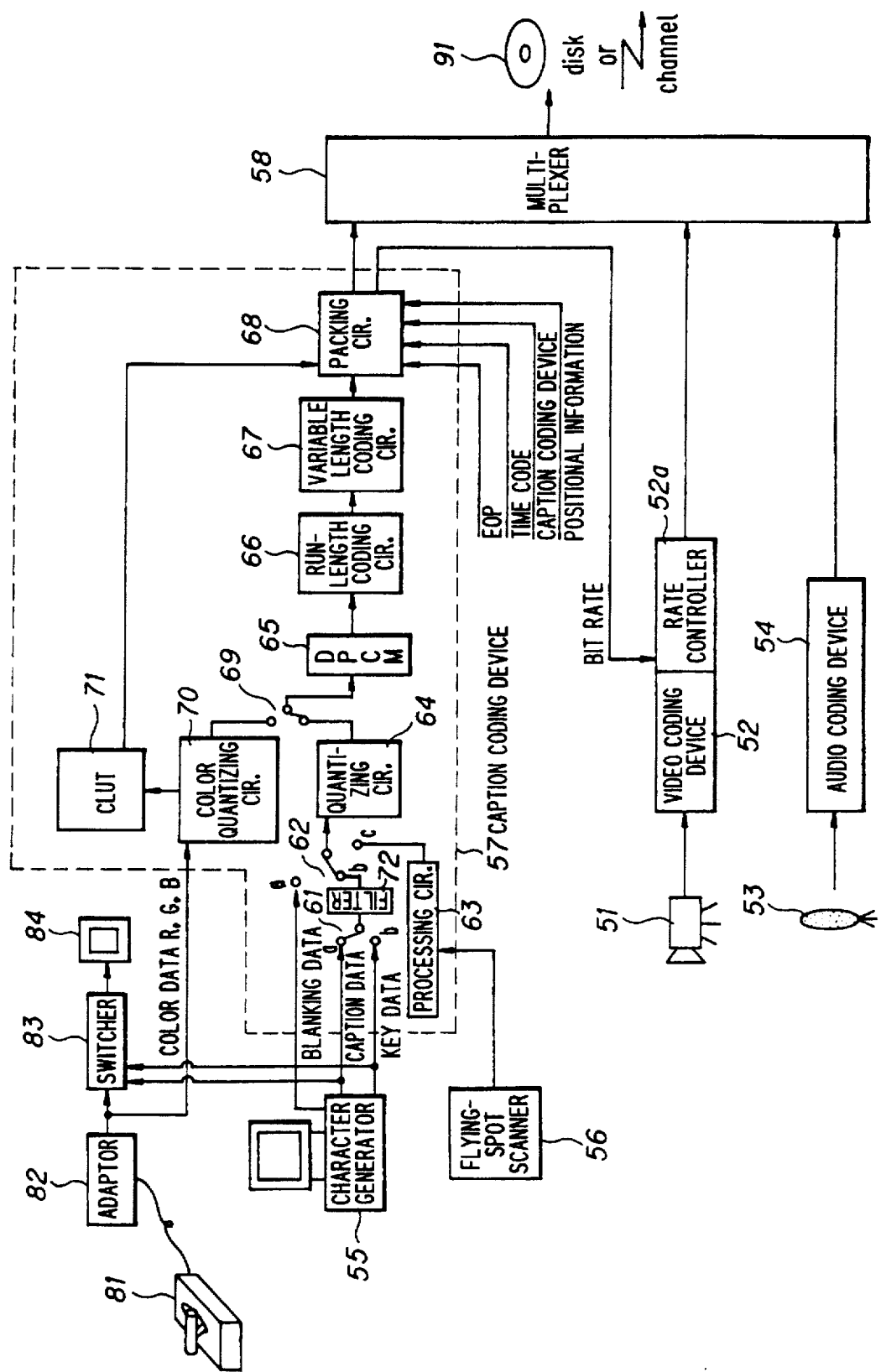
FIG. 1 is a block diagram showing a configuration of an embodiment of a coding apparatus which generates data to be decoded by a caption data decoding device of the present invention.

FIG. 1 is a block diagram showing a configuration of an embodiment of a coding apparatus which generates data to be decoded by a caption data decoding device of the present invention. In this embodiment, a video signal is supplied from a video camera 51 to a video coding device 52, where it is A/D-converted, compressed and converted to packets. It is apparently possible to replace the video camera 51 with a video disc player, a video tape recorder, or the like, and supply a video signal reproduced by such a device to the video coding device 52.

Incorporating a rate controller 52a, the video coding device 52 controls the compression ratio of video data in accordance with a bit rate control signal that is output from a packing circuit 68. Caption data is coded by a caption coding device 57. Where the amount of coded data is small, the total data amount does not increase even if the coded data is added to video data, as described later. That is, the quality of a video image can be made higher. Where the amount of caption data is large, the video data amount is reduced. The video data (for instance, a component video signal of 4:2:2) produced by compression, coding and conversion to packets in the video coding device 52 is supplied to a multiplexer 58.

Similarly, an audio signal obtained by a microphone 53 is supplied to an audio coding device 54, where it is A/D-converted, compressed, coded and converted to packets. The microphone 53 may be replaced with, for instance, a tape recorder, in which case an audio signal reproduced by the tape recorder is supplied to the audio coding device 54. The audio data as coded by the audio coding device 54 is supplied to the multiplexer 58.

On the other hand, caption data generated by a character generator 55 or output from a flying-spot scanner, 56 is supplied to the caption coding device 57, where it is compressed, coded and converted to packets. The caption data thus processed is supplied to the multiplexer 58.

The multiplexer 58 multiplexes (for instance, by time-divisional multiplexing) the packet data respectively output from the caption coding device 57, video coding device 52 and audio coding device 54. After subjecting the data to error correction processing such as ECC processing and modulation processing such as EFM, the multiplexer 58 records the data onto a recording medium such as a disk 91 or transmits it to a receiver side via a channel.

A further description will be made of the caption coding device 57. The character generator 55 generates caption data that corresponds to a video image coded by the video coding device 52, and supplies it to a contact a of a switch 61. Further, the character generator 55 supplies key data to a contact b of the switch 61. The switch 61 selects the caption data or key data as it is switched to the contact a or b at prescribed timings, and supplies the selected data to a quantizing circuit 64 via a digital filter circuit 72 and a contact b of a switch 62.

Figure 2:
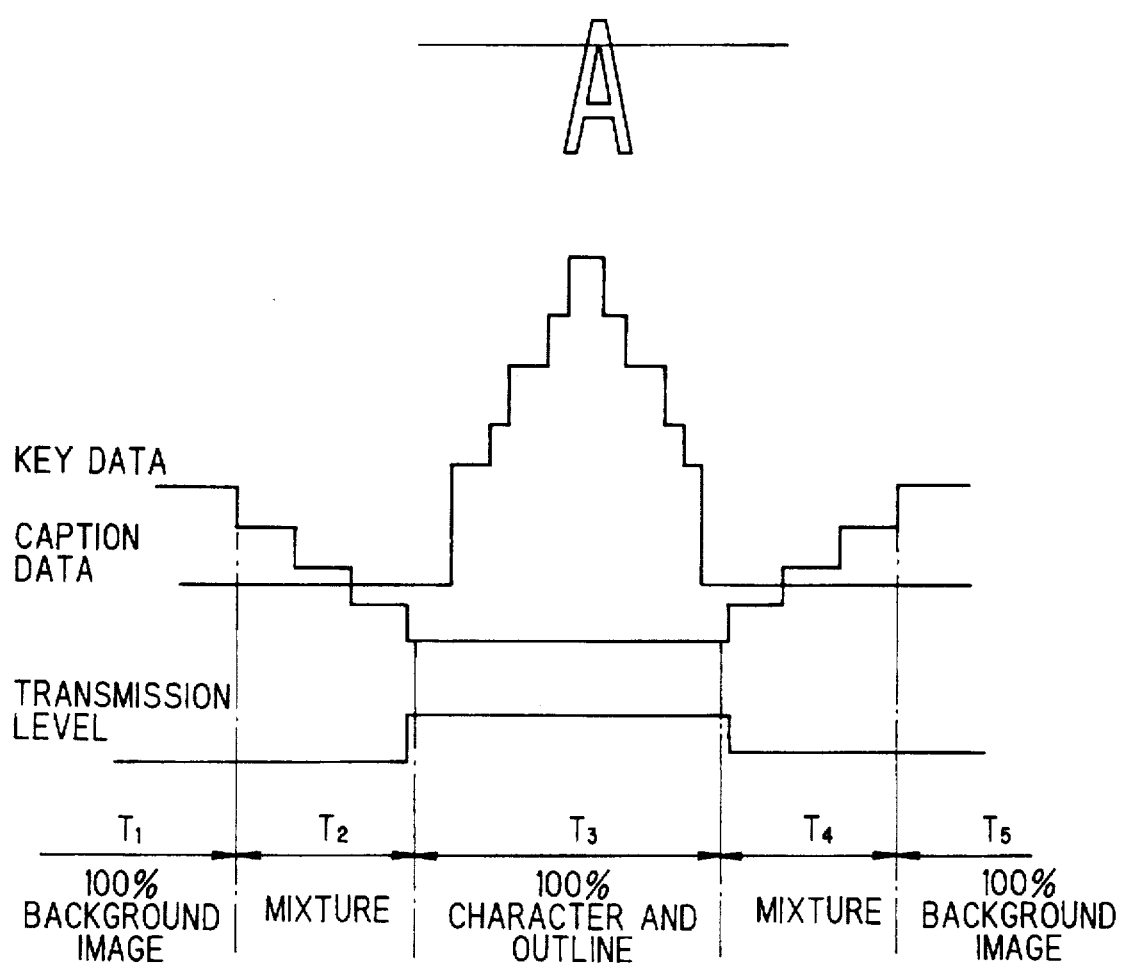
FIG. 2 shows a relationship between caption data and key data.

Referring to FIG. 2, a relationship between the key data and the caption data will be described. As shown in part (a) of FIG. 2, it is assumed that a character A exists as a single character to be displayed in a caption region. Part (b) of FIG. 2 shows caption data of a line (horizontal scanning line) indicated by a horizontal line in part (a). As shown in part (b), the caption data has, in a period T3, levels corresponding to a brightness distribution of the character to be displayed. The caption data has a lowest level in periods T1 and T2 and periods T4 and T5 before and after the period T3, respectively. Thus, the caption data consists of a pattern of a character to be displayed and brightness levels within the pattern.

On the other hand, key data has a lowest level in the period T3 for character display, and a highest level in periods T1 and T5 that are somewhat before and after the period T3. Further, the key data has intermediate levels between the lowest and highest levels in the period T2 that is between the periods T1 and T3 and in the period T4 that is between the periods T3 and T5. In the period T2, the key data gradually changes from the highest level to the lowest level. In the period T4, the key data gradually changes from the highest level to the lowest level.

That is, during the period T3, the video signal of the background video image is attenuated substantially to the black level. On the other hand, during the periods T1 and T5, the caption data corresponding to captions is attenuated to a prescribed level (prescribed gray level in this embodiment; it may be the block level). During the periods T2 and T4, the background video image signal is attenuated in accordance with the values of the key data. In this embodiment, the attenuation degree of the background video image signal is smaller (the attenuation degree of the caption data is larger) when the key data takes a larger value. The attenuation degree of the background video image signal is larger (attenuation degree of the caption data is smaller) when the key data takes a smaller value. In this manner, the background video image signal is attenuated substantially completely during the period for character display, and is gradually attenuated near the those periods. This prevents a caption (characters) from becoming less legible.

Figure 3:
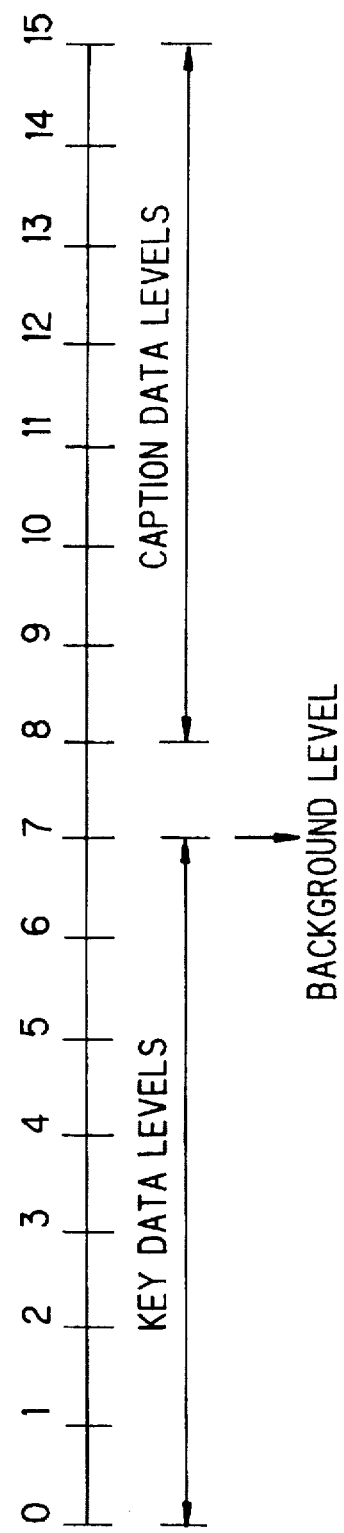
FIG. 3 shows the principle of coding the caption data and the key data.

Returning to FIG. 1, the quantizing circuit 64 expresses, based on a prescribed built-in quantization table, levels of both of the caption data and the key data by 4-bit data. FIG. 3 shows the principle of expressing both of the caption data (fill data) and the key data. As shown in FIG. 3, among 16 gradation levels that can be expressed by 4 bits, 8 levels of level 0 to level 7 are allocated to the key data, and the remaining 8 levels from level 8 to level 15 are allocated to the caption data. That is, the level of the key data is expressed by 4-bit data of 0000 to 0111, and the level of the caption data is expressed by 4-bit data of 1000 to 1111. As a result, the MSB of the 4 bit data represents, so to speak, a transmission level (see FIG. 2). When the MSB is 1, a caption is displayed. When it is 0, the background video image signal is attenuated and a caption is displayed at the 0 level (black frame level). When the key data level is 0111, the attenuation factor of the background video image signal is 0; that is, a background video image is displayed at its own level.

Since both of the key data and the caption data are expressed by 4-bit data in the above manner (since the MSB represents the kind of data, they are substantially 3-bit data), the two kinds of 4-bit data can be arranged in a data stream substantially as the same kind of data, which contributes to simplification of the circuit configuration. It is noted that any number of bits (1 to 4 bits) may be allocated to the caption data. (Where 4 bits are allocated to the caption data, no bit is allocated to the key data; that is, the key data is disregarded.) That is, the numbers of bits allocated to the caption data and the key data can be changed when necessary.

The character generator 55 also supplies blanking data to the quantizing circuit 64 via a contact a of the switch 62. Various kinds of data can be incorporated in the blanking data when necessary.

Figure 4A:
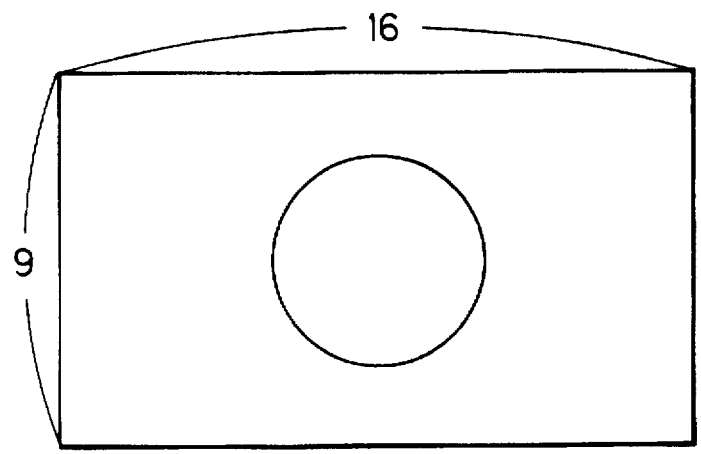
FIGS. 4(a) and 4(b) illustrates the squeeze scheme.

The quantizing circuit 64 also receives, via a contact c of the switch 62, caption data that is output from a processing circuit 63. The processing circuit 63 processes an analog caption data that is output from the flying-spot scanner 56, and produces a resulting signal as digital caption data. Where a video signal supplied to the video coding device 52 is one obtained from a movie by certain conversion, it has an aspect ratio that represents a picture having a longer horizontal dimension, as shown in FIG. 4(a). Recent television receivers include ones having a screen aspect ratio of 16:9, such as Hi-Vision receivers. Television receivers having such a screen aspect ratio can display images at the same aspect ratio as in a movie.

Figure 4B:
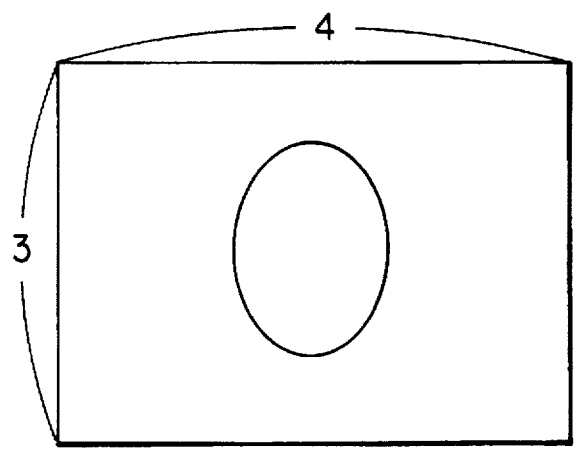

On the other hand, the screen aspect ratio of the conventional NTSC scheme is 4:3 as shown in FIG. 4(b). Images having a longer horizontal dimension can be displayed on a screen having the aspect ratio of the conventional NTSC scheme by converting the aspect ratio to 4:3. But such conversion produces vertically elongated images as also shown in FIG. 4(b).

Television receivers with a screen having a longer horizontal dimension can produce normal images, i.e., images having no vertical elongation as shown in FIG. 4(a) by converting a video signal that has been subjected to conversion to the 4:3 aspect ratio, so as to restore the original aspect ratio. In many cases, television receivers having a longer horizontal dimension incorporate a conversion circuit for restoring the original aspect ratio by converting a video signal that has been subjected to conversion to the 4:3 aspect ratio (squeeze scheme). In view of the above, when receiving images having a longer horizontal dimension as shown in FIG. 4(a), the video coding device 52 performs coding with conversion of those images to ones having the aspect ratio of 4:3 (see FIG. 4(b)) according to the squeeze scheme.

When the aspect ratio conversion of images is effected according to the squeeze scheme in the above manner, it is necessary to also subject associated captions to the aspect ratio conversion according to the squeeze scheme. The processing circuit 63 has such a function.

On the other hand, since the caption data and the key data that are supplied from the character generator 55 are digital data, they are subjected to conversion from ordinary data to squeezed data in the digital filter circuit 72 when necessary, and sent to the quantizing circuit 64 via the contact b of the switch 62.

The caption data (in the following, the term "caption data" (wide sense) is used where appropriate as including the caption data (narrow sense; fill data) and the key data) quantized by the quantizing circuit 64 is input to a DPCM circuit 65, for instance..on a page-by-page basis via a switch 69 that alternately selects between outputs of the quantizing circuit 64 and a color quantizing circuit 70. In the DPCM circuit 65, the quantized caption data is subjected to DPCM. An output of the DPCM circuit 65 is supplied to a run-length coding circuit 66, which codes the input DPCM caption data to paired data of level and run. A variable length coding circuit 67 performs a variable length coding operation on the run data supplied from the run-length coding circuit 66 according to a prescribed variable length coding table. A packing circuit 68 combines the level data and the run data that has been subjected to the variable length coding operation.

In the above operation, the packing circuit 68 adds (multiplexing) to the caption data a time code (PTSS), positional information ("disp start pos" and "disp end pos"), EOP, and caption coding information (subtitle header), all of which will be described later in detail. Further, the packing circuit 68 converts the resulting data to packet data, which are input to the multiplexer 58.

Further, the packing circuit 68 calculates the amount of generated caption data at predetermined time intervals, and supplies a calculation result to the rate controller 52a of the video coding device 52. In its first passage operation, the rate controller 52a recognizes the bit amount of video coding of a first passage. When further recognizing the caption data amount based on the signal sent from the packing circuit 68, that is, at video coding of a second passage, the rate controller 52a sets a bit rate of the video coding device 52 to provide a variable rate that fully utilizes the capacity of the channel or the recording medium such as a disk 91.

To color the caption data that is coded in the above manner, that is, to superimpose colored caption data (fill data) on a video image, a color rectangular region enclosing the caption data (fill data) is generated as follows by means of a bar operating unit 81, a telop coloring adaptor 82, a switcher 83 and a monitor 84.

The caption data and the key data generated by the character generator 55 are supplied to the monitor 84 via the switcher 83, and the monitor 84 displays a caption based on those data. The bar operating unit 81 is so operated as to set a rectangular region that encloses a portion to be colored of the caption displayed on the monitor 84.

The bar operating unit 81 supplies an operation signal corresponding to the above operation to the adaptor 82. The adaptor 82 generates rectangular region data as data of a prescribed color consisting of R, G and B data, for instance. The position and lengths of the rectangular region are varied in accordance with the operation signal sent from the bar operating unit 81. The rectangular region color generated by the adaptor 82 can be changed by operating a color designation operating unit (not shown).

The rectangular region data consisting of the R, G and B data that has been generated by the adaptor 82 is supplied to the switcher 83. In the switcher 83, the rectangular region data is superimposed on the caption data and the key data that are sent from the character generator 55. The resulting data is sent to the monitor 84 and displayed thereon.

While checking a displayed picture on the monitor, a user performs a caption coloring operation by operating the bar operating unit 81 and the color designation operating unit so that a rectangular region of a desired color covers a desired portion of the caption.

More specifically, for example, to make a caption "A" red, the bar operating unit 81 is operated so that a red rectangular region covers a portion enclosing the caption "A." To give a red color to both "A" and "B" (adjacent to each other) of a caption "ABCDE," the bar operating unit 81 is operated so that a red rectangular region covers a portion enclosing "A" and "B."

When a confirmation button (not shown) is operated after a rectangular region of a desired color has been placed so as to cover a desired portion of the caption, the rectangular region data consisting of the R, G and B data generated by the adaptor 82 is supplied to the color quantizing circuit 70 of the caption coding device 57. Incorporating a filter having the same configuration as the digital filter circuit 72, the adaptor 82 squeezes the rectangular region data when necessary.

While referring to stored values of a color look-up table (CLUT) 71, the color quantizing circuit 70 color- quantizes the rectangular region data consisting of the R, G and B data that is sent from the adaptor 82.

More specifically, first, the color quantizing circuit 70 detects, from the stored values of the CLUT 71, values that most closely approximate the color of the rectangular region data consisting of the R, G and B data that is sent from the adaptor 82.

The CLUT 71 stores, at each address that is represented by, for instance, 4 bits, luminance data Y and color difference data Cb and Cr of a color which data are represented by, for instance, 8 bits. That is, the CLUT 71 stores luminance data Y and color difference data Cb and Cr of 16 (=2⁴) colors at the maximum.

Therefore, the color quantizing circuit 70 detects, from the stored colors of the CLUT 71, luminance data Y and color difference data Cb and Cr that most closely approximate the color of the rectangular region data consisting of the R, G and B data that is sent from the adaptor 82.

Upon the detection of the luminance data Y and the color difference data Cb and Cr, the color quantizing circuit 70 converts each dot of the rectangular region data to a 4-bit address of the CLUT 71 at which the detected luminance data Y and color difference data Cb and Cr are stored.

The 4-bit address is supplied to the DPCM circuit 65 via the switch 69, thereafter processed in the same manner as the caption data, and supplied to the multiplexer 58 as color data.

Since one rectangular region is associated with a single address, it can be represented by several bytes (for instance, 2 or 3 bytes per line) by run-length-coding it by the run-length coding circuit 66 even if it is a large region. That is, captions can be colored with a small information quantity.

The color quantizing circuit 70 is so constructed as to be able to update stored values (luminance data Y and color difference data Cb and Cr) to ones that approximate (or are equal to) a color of rectangular region data sent from the adaptor 82 when no stored color of the CLUT 71 approximates the color of the rectangular region data.

In this case, the updated values of the CLUT 71 are sent to the packing circuit 68 to also update stored values of a color look-up table (CLUT; see FIG. 7) 32 of a caption decoding device 7 (described later) which CLUT is constructed in the same manner as the CLUT 71, and incorporated into the header of a packet of the caption data or color data (described later in detail).

Data of a service that uses the blanking period (flyback period), such as teletext, is also supplied to the caption coding device 57, and processed in the same manner as described above. Thus, such data is coded independently of the video data in effective scanning periods, and transmitted. Next, referring to FIG. 5, a description will be made of a packet format of packet data that is output from each of the caption data coding device 57, video coding device 52 and audio coding device 54. One packet consists of a system header and data (caption data, color data, video signal, audio signal, etc.) following it.

The system header consists of a sync signal ("sync") for system synchronization in a decoding apparatus (described later; see FIG. 6), "PTSS" (a time stamp of caption display time when the data is caption data or color data), "type" for indicating the type of data (one of the data relating to captions such as the caption data and the color data, video signal, and the audio signal), and "etc" that is other necessary information.

Where the data that follows the system header is caption data or color data, i.e., subtitle data, it consists of a subtitle header, a coded pattern as caption data or color data of 1 page, and EOP (page terminator, for instance, a 3- byte code of FFFH) indicating the end of one page. EOP is so constructed as to byte-align the packet and subtitle data. In the subtitle header, the following items are arranged in order from the head: a 1-byte channel ("ch"), a 1- byte information type ("inf type"), a 1-byte "mode," a 1-byte "data count," a 2-byte "repeat time", a 2-byte reserved portion (indicated by mark "*" in FIG. 5), a 4-byte display start position ("disp start pos"), a 4-byte display end position ("disp end pos"), a 1-byte reserved portion ("*"), a 1-byte reserved portion ("*"), and a 48-byte loading color look-up table (LCLUT).

The 1-byte channel ("ch") indicates in what language the caption data is described in the coded pattern. One of 4- bit codes assigned to the respective languages is written in the lower 4 bits (0th to 3rd bits) of the channel. The upper 4 bits (4th to 7th bits) are made a reserved portion.

The 1-byte information type ("inf type") indicates whether the coded pattern is caption data (or color data) or other blanking data. If the coded pattern is caption data (or color data), a lower 1 bit (0th bit) is made 0. If the coded pattern is other blanking data, the lower 1 bit is made 1. The 1st to 3rd bits are made a reserved portion.

Further, the information type ("inf type") indicates the number of lines per frame used in displaying the coded pattern, i.e., a video mode as a display scheme. For example, one of the following 4-bit codes is written in the 4th to 7th bits in accordance with the video mode:

| | |
|---|---|
| 0000 | Video mode 1 (NTSC) |
| 0001 | Video mode 2 (PAL/SECAM) |
| 0010 | Video mode 3 (HD 1125: Hi-Vision scheme of 1,125 horizontal scanning lines) |
| 0011 | Video mode 4 (HD 1250: Hi-Vision scheme of 1,250 horizontal scanning lines) |
| 0100 | Video mode 5 (ATV-1: ATV of interlaced scanning scheme) |
| 0101 | Video mode 6 (ATV-2: ATV of non-interlaced scanning scheme) |

Codes 0110, 0111 and 1xxx ("x" means Don't care) are not used.

The 1-byte "mode" indicates a decoding scheme of the coded pattern (caption data or color data) employed in the caption decoding device 7 (described later in connection with FIG. 7). More specifically, the 0th bit is made 0 if a caption to be superimposed on a video image is represented by only one of the caption data and the color data (a description will be made later of the case where a caption is represented only by the color data), and is made 1 if a caption is represented by both of the caption data and the color data, i.e., if a caption is to be colored. The 1st bit is effective only when the 0th bit is 0, i.e., when a caption is represented by only one of the caption data and the color data. The 1st bit is made 0 when a caption is represented only by the caption data, and is made 1 when a caption is represented only by the color data. Further, the 2nd bit of the "mode" is made 1 when stored values (luminance data Y and color difference data Cb and Cr) of the CLUT 32 of the caption decoding device 7 are to be changed, and is made 0 when no stored values are to be changed. That is, the 3rd bit is made 1 only when luminance data Y and color difference data Cb and Cr are supplied from the CLUT 71 (see FIG. 1) to the packing circuit 68.

The 3rd to 5th bits are made a reserved portion. A code corresponding to a (inverse) quantization table to be used in an inverse quantizing operation in an inverse quantizing circuit (IQ) 26 of the caption decoding device 7 is written in the 6th and 7th bits. Since, as described above, any number of bits (1 to 4 bits) may be allocated to the caption data (fill data), one of the following 2-bit codes, for instance, is written in the 6th and 7th bits in accordance with a quantization table that is used in the quantizing operation of the quantizing circuit 64 in accordance with the number of allocated bits:

| | |
|---|---|
| 00 | Quantization table 0 (Caption data: 1 bit) |
| 01 | Quantization table 1 (Caption data: 2 bits) |
| 10 | Quantization table 2 (Caption data: 3 bits) |
| 11 | Quantization table 3 (Caption data: 4 bits) |

Therefore, if the bit allocation is as shown in FIG. 3, the 6th and 7th bits of the "mode" are made "10."

The 2-byte "data count" indicates the data amount of the coded pattern. The data amount of the coded pattern in written in the lower 14 bits (0th to 13rd bits) on a byte basis. The upper 2 bits (14th and 15th bits) are made a reserved portion.

Figure 7:
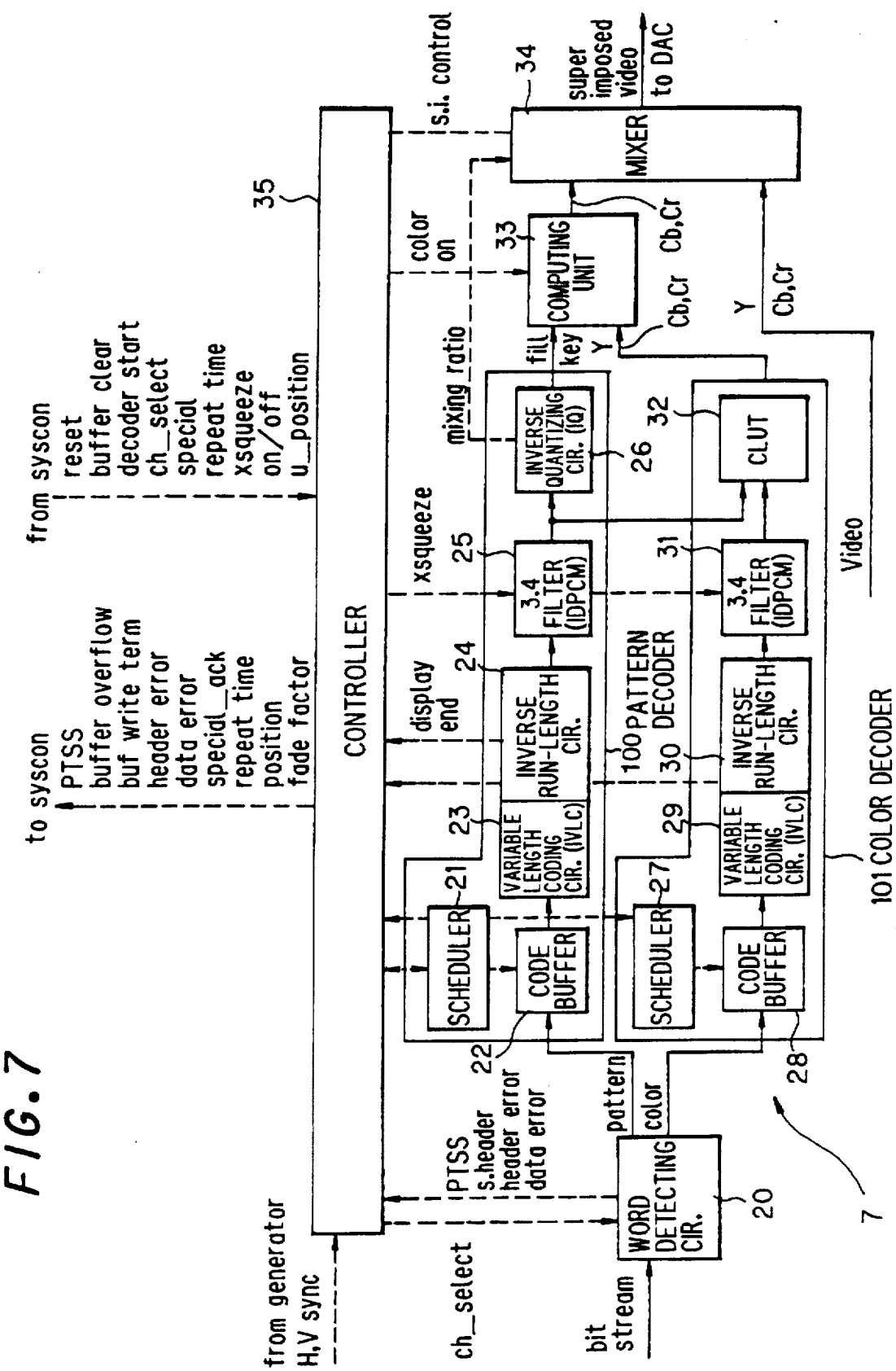
FIG. 7 is a block diagram showing a detailed configuration of a caption decoding device of the present invention.

The 2-byte "repeat time" indicates the number of repeat times of decoding the coded pattern in the caption decoding device 7 (see FIG. 7). The number of decoding repeat times is written in the lower 8 bits (0th to 7th bits) in terms of the number of frames (or fields). Therefore, in the caption decoding device 7, the coded pattern is repeatedly decoded during 256 (=2⁸) frames at the maximum.

More specifically, for example, to display a certain caption that is represented by a coded pattern during 256 frames such that it is superimposed on a video image, "11111111" is written in the lower 8 bits of the repeat time. The upper 8 bits (8th to 14th bits) of the "repeat time" are made a reserved portion.

The 4-byte display start position ("disp start pos") indicates a display start position of the caption data or color data. An x-coordinate of the display start position is written in the lower 16 bits (0th to 15th bits) in terms of, for instance, the number of pixels counted from the left end (number of pixels in the horizontal direction), and a y- coordinate of the start position is written in the upper 16 bits (16th to 31st bits) in terms of, for instance, the number of horizontal scanning lines counted from the top end of a frame (number of lines in the vertical direction).

The 4-byte display end position ("disp end pos") indicates a display end position of the caption data or color data. As in the case of the above-described display start position, an x-coordinate of the display end position is written in the lower 16 bits (0th to 15th bits), and a y- coordinate of the end position is written in the upper 16 bits (16th to 31st bits).

Eight-bit luminance data Y and color difference data Cb and Cr for each of 16 colors are written in the 48-byte loading color look-up table (LCLUT) only when the 2nd bit of the above-described "mode" is 1, i.e., when the stored values (luminance data Y and color difference data Cb and Cr) of the CLUT 32 of the caption decoding device 7 (see FIG. 7) need to be changed in the same manner as the stored values of the CLUT 71 because the stored values of the CLUT 71 have been changed. (When the 2nd bit of the "mode" is 0, the LCLUT is deleted from the subtitle header.)

More specifically, for example, luminance data Y and color difference data Cb and Cr that are stored at address 0000 of the CLUT 71 (see FIG. 1) and should replace luminance data Y and color difference data Cb and Cr (each represented by 8 bits) that are stored at address 0000 of the CLUT 32 (see FIG. 7) are written 8 bits by 8 bits in the 0th to 23rd bits of the LCLUT. Luminance data Y and color difference data Cb and Cr that are stored at address 0001 of the CLUT 71 and should replace luminance data Y and color difference data Cb and Cr that are stored at address 0001 of the CLUT 32 (see FIG. 7) are written in the 24th to 47th bits. In this manner, luminance data Y and color difference data Cb and Cr of the 16 colors that are stored in the CLUT 71 are written in the 0th to 383rd bits. Where the writing to the LCLUT is performed in the above manner, all the colors (luminance data Y and color difference data Cb and Cr) stored in the CLUT 32 (see FIG. 7) are replaced by those of the LCLUT. On the other hand, it is possible to replace the luminance data Y and color difference data Cb and Cr of colors that are desired to be replaced. This can be done by writing, to the LCLUT, addresses at which the colors to be replaced are stored, luminance data Y and color difference data Cb and Cr to be written at those addresses, and the number of colors to be changed.

Figure 6:
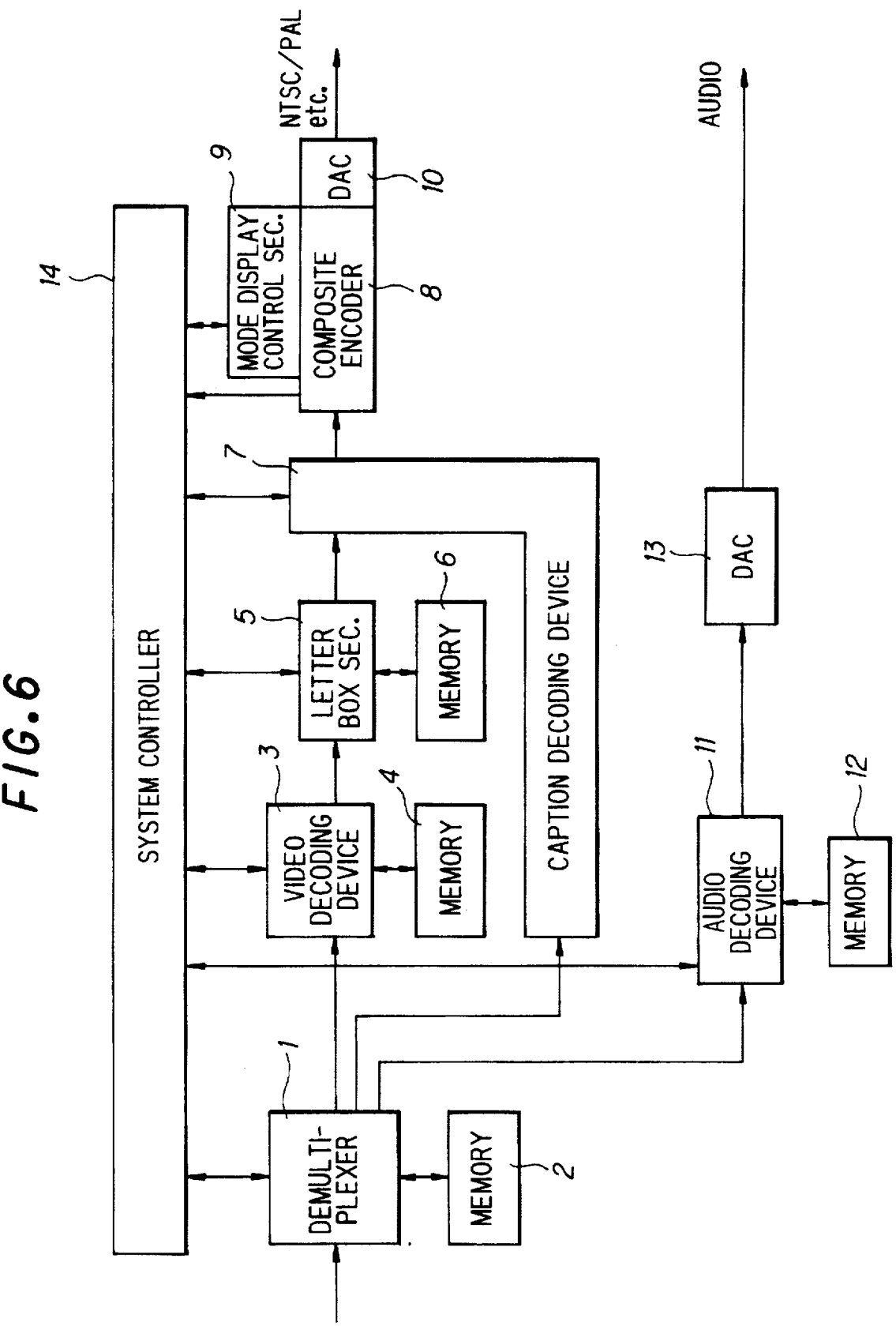
FIG. 6 is a block diagram showing a configuration of an embodiment of a decoding apparatus for decoding data output from a coding apparatus of the present invention.

Next, FIG. 6 shows a configuration of an embodiment of a decoding apparatus for decoding data having the above-described format which has been transmitted through a transmission line or obtained from a recording medium such as the disk 91 (see FIG. 1) by reproduction through a servo system. First, the data is input to a demultiplexer 1 also serving as a data decoder. In the demultiplexer 1, a system header is first detected from the input data, and data following the system header is demodulated (channel-decoded; for instance, EFM-modulated data is demodulated) while a memory 2 is used. Further, in the demodulator 1, ECC processing is performed and, when an error is detected, an error detection signal ("error") is supplied to a system controller 14.

While the "type" of the system header is referred to, the data are separated into data relating to captions (caption data and color data), video data and audio data, which are supplied, each together with a strobe signal, to the caption decoding device 7, a video decoding device 3 and an audio decoding device 11, respectively.

Upon reception of the strobe signal from the demultiplexer 1, the caption decoding device 7, video decoding device 3 and audio decoding device 11 receive the data relating to captions, the video data and the audio data, respectively, each of which is sent together with the strobe signal.

The video decoding device 3 decodes the video data by using a memory 4, and the audio decoding device 11 decodes the audio data by using a memory 12. If an error correction code or error detection code is attached to the video data or audio data, the video decoding device 3 or audio decoding device 11 performs necessary ECC or CRC check processing.

The decoded audio data is supplied to a DAC (D/A converter) 13, where it is subjected to D/A conversion to become an analog audio signal. The analog audio signal is output from an audio output device (not shown) such as a speaker.

The decoded video data is supplied to a letter box section 5. Where the video data is one that has been subjected to the conversion to a 4:3 aspect ratio by the squeeze scheme described above, the video data is thinned (shortened) to ¾ in the vertical direction so that a monitor of a 4:3 screen aspect ratio produces video images having a circularity of 100%. This processing, which is hereinafter called letter box processing, is performed by, for instance, filtering the video data.

In the letter box section 5, the letter box processing is performed by using a timing adjusting memory 6 that can store video data of at least ¼ (=1¾) field (or frame). Having a through-path, the letter box section 5 outputs the video data without processing it where it has not been subjected to the conversion to a 4:3 aspect ratio by the squeeze scheme, i.e., where it has a 4:3 aspect ratio originally.

On the other hand, the caption decoding device 7 decodes the data relating to captions, i.e., the caption data and the color data which are supplied from the demultiplexer 1. The decoded data relating to captions is superimposed on the video data that is output from the letter box section 5, and the resulting data is supplied to a composite encoder 8. In the composite encoder 8, the video data on which the data relating to captions has been superimposed is converted to a signal of a prescribed display scheme (for instance, NTSC, PAL or SECAM, or one of other schemes mentioned above: HD 1125, HD 1250, ATV-1 and ATV-2), and then supplied to a DAC (D/A converter) 10. In the DAC 10, the video data is D/A-converted to become an analog video signal, which is displayed on an image display device (not shown) such as a television receiver.

The system controller 14 controls the respective blocks constituting the decoding apparatus of FIG. 6 in accordance with information sent from the respective blocks and an operation on an operating unit (not shown). A mode display control section 9 performs control to display a command corresponding to an operation on the operating unit and other various kinds of information on a dedicated display (not shown) or superimpose those on video data that is input to the composite encoder 8. For example, the above-mentioned various kinds of information include facts that the decoding apparatus is so set as to superimpose captions on a video image, and that the decoding apparatus is so set as to display captions in a certain language.

Next, referring to FIG. 7, details of the caption decoding device 7 will be described. First, upon reception of the strobe signal from the demultiplexer 1 (see FIG. 6), a word detecting circuit 20 receives a bit stream in a packet form as the data relating to captions (see FIG. 5; hereinafter referred to as a caption bit stream) that is also from the demultiplexer 1. Since packets are time-divisionally multiplexed as described above, the bit stream is not necessarily included in a single packet.

Then, the system header and the subtitle header (written as "s. header" in FIG. 7) are detected from the caption bit stream, and the time stamp (PTSS; see FIG. 5) of the system header and necessary ones of the pieces of information written in the subtitle header (for instance, the "repeat time", display start position ("disp start pos") and display end position ("disp end position")) are input to a controller 35, which controls the respective blocks constituting the caption decoding device 7 in synchronism with the timing of a horizontal sync signal (H sync) or a vertical sync signal (V sync). The horizontal sync signal and the vertical sync signal are output from a clock generator (not shown). In FIG. 7, the display start position ("disp start pos") and the display end position ("disp end pos") are written together as a "position".

Controlled by the system controller 14 (see FIG. 6), the controller 35 controls the respective blocks constituting the caption decoding device 7 based on information output from the word detecting circuit 20 and other information.

Where an error detection code such as CRC is added to the system header, the subtitle header and the coded pattern (caption data or color data) that follows the subtitle header (see FIG. 6), the word detecting circuit 20 performs a CRC check. When an error is found, the word detecting circuit 20 supplies a "header error" or "data error" to the controller 35. Further, the word detecting circuit 20 receives a channel designation signal ("ch_select") from the system controller 14 via the controller 35. Referring to channels ("ch"; see FIG. 5) of subtitle headers as detected from caption bit streams, the word detecting circuit 20 detects the channel that coincides with that represented by the channel designation signal ("ch_select").

The channel designation signal ("ch_select") is output from the system controller 14 when a user operates the operating unit, and represents a channel of captions (language) to be superimposed on video data.

When detecting the subtitle header having the channel ("ch") which coincides with that represented by the channel designation signal ("ch_select"), the word detecting circuit 20 separates the byte-aligned subtitle data (see FIG. 5) having the detected subtitle header from the caption bit stream, and sends the remainder to the controller 35.

On the other hand, the subtitle data separated from the caption bit stream is forwarded to a pattern decoder 100 if its coded pattern is caption data (wide sense), and forwarded to a color decoder 101 if its coded pattern is color data. The judgment of whether the coded pattern is caption data or color data is performed by referring to the information type ("inf type") and the "mode" of the subtitle header (see FIG. 5). The pattern decoder 100 consists of a scheduler 21, a code buffer 22, a variable length decoding circuit (IVLC) 23, an inverse run-length circuit 24, a 3:4 filter 25, and an inverse quantizing circuit (IQ) 26. The color decoder 101 consists of a scheduler 27, a code buffer 28, a variable length decoding circuit (IVLC) 29, an inverse run-length circuit 30, a 3:4 filter 31, and a color look-up table (CLUT) 32. The schedulers 21 and 27, the code buffers 22 and 28, the variable length decoding circuits 23 and 29, the inverse run-length circuits 24 and 30, and the 3:4 filters 25 and 31 each have the same configuration respectively, and operate independently of each other. It can be said that the pattern decoder 100 and the color decoder 101 have the same configuration except the inverse quantizing circuit 26 and the CLUT 32.

Therefore, a description will be made only of the scheduler 21, code buffer 22, variable length decoding circuit (IVLC) 23, inverse run-length circuit 24 and 3:4 filter 25 of the pattern decoder 100, and a description of the corresponding parts of the color decoder 101 will be omitted.

The caption data output from the word detecting circuit 20 is forwarded to the code buffer 22 and stored therein. Where the code buffer 22 is an externally provided RAM, for instance, it is so constructed as to secure at least two 128 kilobit banks, i.e., have at least two banks each having a capacity of 128 kilobits. The data writing to and reading from the code buffer 22 are controlled by the scheduler 21 which generates a write address and a read address.

The scheduler 21 supplies, in addition to the write address or read address ("address"), a negative logic chip enable ("xce"), and a negative logic write enable ("xre") or output enable ("xoe") to the code buffer 22, and controls writing of "data" from the word detecting circuit 20 or reading of "data" to the variable length decoding circuit 23.

As a result, as shown in FIG. 8, while data is written to one bank (for instance, bank 1) of the code buffer 22, data is read out from the other bank (for instance, bank 0). Conversely, while data is written to bank 0, data is read out from bank 1. This switching of the banks is performed with synchronization taken correctly in accordance with PTSS by utilizing EOP that indicates the end of a page. This allows the data that is supplied from the word detecting circuit 20 to be processed consecutively.

Since, as described above, the input data to the decoding apparatus of FIG. 6 is divided in time, 1-page caption data (indicated by one hatched triangle in FIG. 8) to be written to the code buffer 22 is also divided in time as shown in FIG. 8 unless the data amount is very small. On the other hand, 1-page color data (indicated by one shaded triangle in FIG. 8) to be written to the code buffer 28 is included in one certain divided timing because the data amount is very small as described above.

After reception of a "decoder start" signal from the controller 35, the scheduler 21 effects reading of the caption data (byte-aligned on a frame-by-frame basis) from the code buffer 22 with a proper delay time from the timing of the vertical sync signal by the number of times corresponding to the "repeat time" (the number of frames during which the caption data is to be displayed) written in the subtitle header. After the caption data has been read from the code buffer 22 by the number of times corresponding to the "repeat time," that caption data is removed from the code buffer 22. The "decoder start" signal for indicating the start of decoding is output from the controller 35 in the following manner. As described above, when PTSS (time stamp of caption display time) is supplied from the word detecting circuit 20 to the controller 35, the controller 35 forwards PTSS to the system controller 14 (see FIG. 6). At a time point when the clock in the system coincides with PTSS, the system controller 14 supplies the "decoder start" signal to the controller 35. The controller 35 forwards the received decoder start signal to the scheduler 21.

Control of the data reading from the code buffer 22 by the number of times corresponding to the "repeat time" is performed by the controller 35 in the following manner. When, as described above, the "repeat time" of the subtitle header (see FIG. 5) is supplied from the word detecting circuit 20 to the controller 35, the controller 35 forwards it to the system controller 14 (see FIG. 6). Referring to PTSS, the system controller 14 supplies the received "repeat time" to the controller 35 at the caption data decoding timing.

After supplying the "repeat time" to the controller 35, the system controller 14 supplies, also to the controller 35, a decrement pulse ("decrement_pulse") for decrementing the "repeat time" by one at a timing synchronized with the frame rate timing. The controller 35 decrement one by one the "repeat time" received from the system controller 14 at the timing of receiving the decrement pulse also from the system controller 14.

When the value of the "repeat time" has become 0, the controller 35 controls the scheduler 21 so as to delete, from the code buffer 22, the data the decoding (reading) of which has just finished.

In the above operation, if normal reproduction (normal speed reproduction) is designated by operating the operating unit, the system controller 14 supplies a "special" signal indicating the normal reproduction to the controller 35. In this case, the system controller 14 supplies decrement pulses ("decrement_pulse") to the controller 35 in synchronism with the frame rate timing, as described above.

If special reproduction such as n-fold speed reproduction (n-fold speed FF/FR), slow reproduction, frame feeding or pausing is designated by operating the operating unit, the system controller 14 supplies a "special" signal indicating the special reproduction to the controller 35. In this case, the system controller 14 supplies decrement pulses ("decrement_pulse") to the controller 35 at the timing in accordance with the special reproduction.

That is, when the system controller 14 outputs a "special" signal indicating, for instance, n-fold speed FF/FR, it also outputs decrement pulses ("decrement_pulse") at a rate n times the frame rate. On the other hand, when the system controller 14 outputs a "special" signal indicating pausing (0-fold speed reproduction), it does not output decrement pulses (decrement_pulse). Therefore, in this case, the same caption data continues to be read out from the code buffer 22.

In response to the "special" signal sent from the system controller 14, the controller 35 transmits an acknowledgment ("special_ack") to the system controller 14. Upon finishing the control of writing data to bank 1 of the code buffer 22, the scheduler 21 supplies a write termination signal ("buf write term") to the controller 35, which forwards the received write termination signal to the system controller 14. With this operation, the system controller 14 can detect abnormality in the data supplied to the code buffer 22. More specifically, if no data is supplied to the code buffer 22, or if EOF is not detected, the system controller 14 does not receive any write termination signal ("buf write term") during that period and thereby detects abnormality.

The bandwidth of access to the code buffer 22 which access is controlled by the scheduler 21 is set, for instance, in the following manner. Where the data output rate from the demultiplexer 1 (see FIG. 1) is 20 Mbps at the maximum and the code buffer 22 has an 8-bit I/O port, the writing to the code buffer 22 is performed at 2.5 (=20/8) MHz. Further, if the display rate is 13.5 MHz, and if the data is compressed to allow data reading from the code buffer 22 at more than 8.5 MHz with a properly configured variable length coding (decoding) table, the bandwidth necessary for writing and reading data to and from the code buffer 22 is 11 (2.5+8.5) MHz.

The caption data read from the code buffer 22 is supplied to the variable decoding circuit 23. Referring to a built-in variable length coding table (variable length decoding table), the variable length decoding circuit 23 subjects the data from the code buffer 22 to variable length decoding. As a result, the caption data is converted to sets of run and level, which are supplied to the inverse run-length circuit 24. The inverse run-length circuit 24 generates levels that are equal in number to runs, and outputs of the circuit 24 are supplied to the 3:4 filter 25.

Detecting EOPs from the data supplied from the variable length decoding circuit 23, the inverse run-length circuit 24 supplies a "display end" flag to the controller 35 when the number of EOPs becomes equal to the "repeat time". Further, when detecting EOP from the input caption bit stream, the word detecting circuit 20 informs the controller 35 of this fact. If the controller 35 receives a signal indicating detection of EOP of the next page (not EOP of the page being decoded, because the code buffer 22 has a two-bank structure) from the word detecting circuit 20 before receiving a "display end" flag from the inverse run-length circuit 24, that is, if a timing relationship is established in which the transfer of the caption bit stream (caption data (or color data)) that is supplied from the demultiplexer 1 is so fast that before data reading from one of the two banks of the code buffer 22 (or code buffer 28) is completed the next data is supplied to that bank, the controller 35 sends a "buffer overflow" signal to the system controller 14. Upon reception of the buffer overflow signal, the system controller 14 prohibits the demultiplexer 1 from outputting new data.

Where a television receiver that is provided downstream of the DAC 10 (see FIG. 6) has a screen aspect ratio of 4:3, the 3:4 filter 25 filters the caption data that has been squeezed in the horizontal direction in the manner as described above by use of a 3:4 interpolation filter, to thereby convert the caption data so that it is displayed with a 100% circularity. In this case, where an original picture of an aspect ratio 16:9 consists of 720×480 pixels and, therefore, a squeezed picture has 540 (720×¾) pixel in the horizontal direction, the controller 35 controls the scheduler 21 so that data reading from the code buffer 22 is started at a timing 90 pixels earlier than the timing of the horizontal sync signal. After the above data conversion, the 3:4 filter 25, which incorporates an IDPCM circuit, subjects the converted data to IDPCM, and the resulting data is supplied to the inverse quantizing circuit 26.

Where a television receiver that is provided downstream of the DAC 10 has a screen aspect ratio of 16:9, the 3:4 filter 25 subjects the output data of the inverse run-length circuit 24 to only IDPCM (this is hereinafter called "bypassing the 3:4 filter 25"), and the resulting data is supplied to the inverse quantizing circuit 26. Whether to bypass the 3:4 filter 25 is determined based on a squeeze signal ("xsqueeze") that is supplied from the controller 35. The squeeze signal ("xsqueeze") is supplied from the system controller 14 to the controller 35 when the operating unit is operated by a user. The inverse quantizing circuit 26 converts the 4-bit caption data (wide sense; explained above in connection with FIG. 3) that is supplied from the 3:4 filter 25 to caption data (narrow sense; fill data) and key data, which are supplied to a computing unit 33. The key data is also supplied to a mixer 34 as data indicating a "mixing ratio" between a caption and a video image.

Although not shown in any figure, the controller 35 supplies a quantization (inverse quantization) table designating signal to the inverse quantizing circuit 26 while referring to the "mode" of the subtitle header. The inverse quantizing circuit 26 has a plurality of (inverse) quantization tables, and performs an inverse quantizing operation using one of those tables corresponding to the quantization (inverse quantization) table designating signal sent from the controller 35.

On the other hand, the CLUT 32 is supplied with color data which has been processed by the scheduler 27, code buffer 28, variable length decoding circuit 29, inverse run-length circuit 30 and 3:4 filter 31 in the same manner as the caption data (see the above).

As described above, the color data is a 4-bit address to be used for outputting rectangular region data of a caption color (color rectangular region data) from the CLUT 32 that stores 8-bit luminance data Y and color difference data Cb and Cr of each of 16 colors, for instance. Therefore, the CLUT 32 outputs the color rectangular data consisting of the 8-bit luminance data Y and color difference data Cb and Cr, which is supplied to the computing unit 33.

The CLUT 32 is constituted down-loadably. That is, the luminance data Y and the color difference data Cb and Cr stored in the CLUT 32 can be changed to those data written in the above-described LCLUT of the subtitle header in accordance with the "mode" also written in the subtitle header. Further, the stored values of the CLUT 32 can be reset to default values by the controller 35, when a system reset ("reset") is supplied from the system controller 14 to the controller 35. The system reset ("reset") is supplied from the system controller 14 to the controller 35, for instance, immediately after the power on of the apparatus. Further, immediately after the power on of this apparatus, a "buffer clear" for clearing the code buffers 22 and 28 is also supplied from the system controller 14 to the controller 35.

In the computing unit 33, the color rectangular region data (only the luminance data Y) and the caption data (fill data) from the inverse quantizing circuit 26 are multiplied together; that is, the color rectangular region data is, say, punched out by the caption data (fill data), to produce color-bearing caption data. Since the color difference data Cb and Cr are associated with the luminance data Y, they are not used in the calculation in the computing unit 33.

The color-bearing caption data (luminance data Y) and the color difference data Cb and Cr are supplied from the computing circuit 33 to the mixer 34.

When the "mode" of the subtitle header (see FIG. 5) indicates that a caption is not colored, that is, when a caption is represented by only caption data (fill data) and key data (i.e., without color data), the color decoder 101 stops its operation. In this case, the pattern decoder 100 operates in the manner described above, and the resulting caption data (fill data) and the key data are supplied to the mixer 34 bypassing the computing unit 33.

Whether computing unit 33 should pass the data that are sent from the pattern decoder 100 without processing those is determined as follows. The controller 35 refers to the "mode" of the subtitle header (see FIG. 5). If its first bit is "1," which means that the caption is represented by both caption data and color data, the controller 35 makes a "color on" signal in a on state and supplies it to the computing unit 33. The computing unit 33 performs the above-described calculation only when receiving a "color on" signal in a on state from the controller 35, and does not process input data in the other cases.

The mixer 34 receives, in addition to the output (luminance data Y) of the computing unit 33 that represents a caption, the video decoded output (luminance data Y and color difference data Cb and Cr) of the video decoding device 3 (see FIG. 6) that represents a background image via the letter box section 5. The mixing circuit 34 superimposes the caption on the background image based on the key data that indicates a "mixing ratio."

More specifically, the mixer 34 attenuates the luminance data Y of the background image or caption in accordance with the key data, and then adds together the two kinds of luminance data Y. As a result, as described above in connection with FIG. 2, when the key data has a smaller value, the data representing the caption is mixed at a larger ratio (less attenuated) and the data representing the background image is mixed at a smaller ratio (more attenuated). Thus, the background image and the caption are mixed with each other smoothly.

The mixer 34 superimposes a caption on a background image only when a superimpose on/off signal ("on/off"; indicated in FIG. 7 as "s. i. control" which also includes the "position," a user position ("u_positionl"; described later) and a "fade factor" (described later)) is in the on state. The on-state superimpose on/off signal ("on/off") is supplied from the system controller 14 to the controller 35 when a user operates the operating unit.

Where it is not necessary to superimpose captions, the of-state superimpose on/off signal ("on/off") is supplied from the system controller 14 to the controller 35 by a user's operation on the operating unit. In this case, the mixer 34 outputs only the video coded output of the video coding device 3 without processing it.

The mixer 34 receives the "position" (display start position ("disp start pos") and display end position ("disp end pos")) indicating a display position of captions from the controller 35. The mixer 34 superimposes a caption at the display position indicated by the "position."

When a user designates a display position of captions by operating the operating unit, the user position ("u_position") indicating the display position is supplied to the mixer 34 via the system controller 14 and the controller 35. When receiving the user position ("u_position"), the mixer 34 superimposes a caption at the display position indicated by the user position ("u_position") rather than that indicated by the "position."

Figure 5:
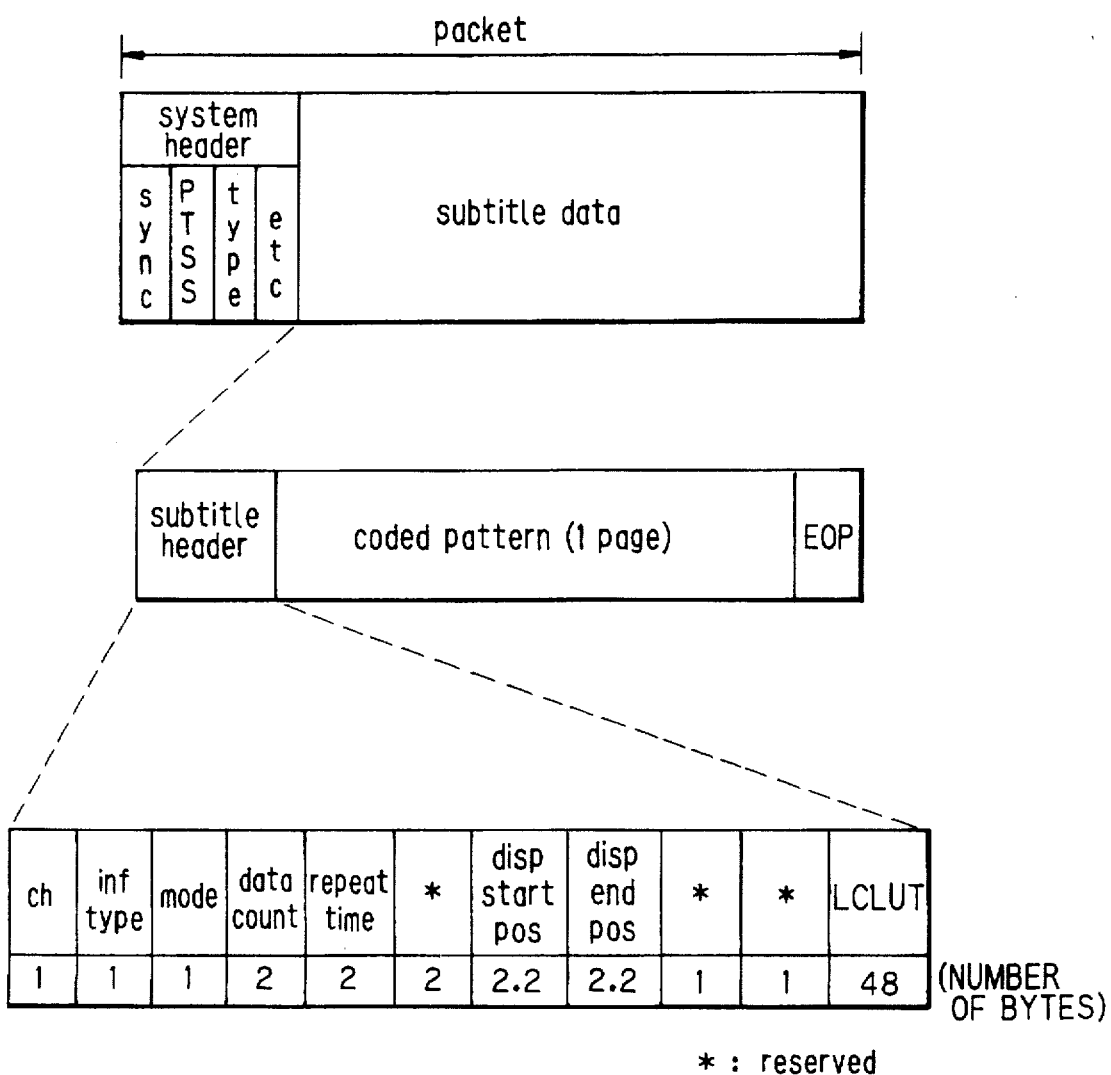
FIG. 5 shows a format of data output from the coding apparatus of FIG. 1.

Although not shown in FIG. 5, the "fade factor" indicating a caption fade-in/fade-out speed can be written in one of the reserved portions of the subtitle header in addition to the above data. When the "fade factor" is written in the subtitle header, the mixer 34 performs fade-in and fade-out of a caption at a speed indicated by the "fade factor."

In addition to the color data, the 4-bit caption data (fill data and key data) that is to be input to the inverse quantizing circuit 26 can be supplied to the CLUT 32, which may be constituted, for instance, of an EXOR circuit 40 and a table 41 as shown in FIG. 9.

In this case, the color data as a 4-bit address is input to the EXOR circuit 40. Further, the EXOR circuit 40 receives, for instance, the MSB (which takes a value 1 when the caption data (wide sense) is caption data (narrow sense), i.e., fill data and a value 0 when it is key data, as described above in connection with FIG. 3) of the 4-bit caption data. The EXOR circuit 40 calculates the EXOR (exclusive OR) of each bit of the 4-bit color data and the MSB of the caption data.

Therefore, the output of the EXOR circuit 40 is different from the color data input thereto at a timing when the caption data (wide sense) is caption data (narrow sense), i.e., fill data, and is the color data itself at a timing when it is key data.

The output of the EXOR circuit 40 is input to a table 41. Storing the 8-bit luminance data Y and color difference data Cb and Cr of 16 colors as described above, the table 41 outputs specific 8-bit luminance data Y and color difference data Cb and Cr stored at the address indicated by the output of the EXOR circuit 40.

If the EXOR circuit 40 were not provided, the output of the table 41 would be color rectangular region data as shown in FIG. 10(b) that consists of luminance data Y and color difference data Cb and Cr stored at the address indicated by the color data, as in the above-described case.

On the other hand, where the EXOR circuit 40 is provided as shown in FIG. 9, the address output from the EXOR circuit 40 is different from the input address at a timing when the caption data (wide sense) is caption data (narrow sense), as described above. That is, the address output from the EXOR circuit 40 is switched depending on whether the MSB of the caption data (wide sense) is 1 or 0. Therefore, at a timing of fill data, the luminance data Y and color difference data Cb and Cr output from the table 41 are also changed; that is, the table 41 outputs color rectangular region data in which only the portions corresponding to the fill data have a different color.

For example, assume here that the caption data (fill data) is a character string "ABCDE" as shown in FIG. 10(a), and that the color data is an address for outputting a color rectangular region as shown in FIG. 10(b) that encloses characters "A" and "B" from the table 41. By changing the color data (address) at the timing of the caption data (fill data), that is, by "punching out" the color rectangular region at the timing of the caption data (fill data), data as shown in FIG. 10(c) is output in which the portions corresponding to characters "A" and "B" of the color rectangular region of FIG. 10(b) are changed to have a different color which is represented by luminance data Y and color difference data Cb and Cr stored at the address (color data) that has been changed by EXORing with the MSB of the caption data (wide sense). In the computing unit 33, first, the output (shown in FIG. 10(c)) of the table 41 is "punched out" in accordance with the key data sent from the inverse quantizing circuit 26. As a result, the output of the table 41 (shown in FIG. 10(c)) becomes caption data (luminance data Y and color difference data Cb and Cr) in which, as shown in FIG. 10(d), the caption data (fill data) is given data representing a character frame of the original color (obtained when the color data (address) for outputting the color rectangular region data from the table 41 is not changed) of the color rectangular region.

However, in the above case, the character (fill) portions are obtained by "punching out" the color rectangular region data at the timing of the caption data (fill data). Therefore, the luminance varies steeply at the boundaries between the character frames and the characters (fill), making the caption less legible.

To solve this problem, in the computing unit 33, the caption data with the character frame is multiplied by the smoothly varying caption data (fill data) supplied from the inverse quantizing circuit 26, and the resulting data is input to the mixer 34. With this operation, the luminance variation at the boundaries between the character frames and the characters is smoothed, to output a legible caption with the character frame.

As described above, by constituting the CLUT 32 as shown in FIG. 9, a character frame can be attached to a caption without the need of any information on the character frame, i.e., with a small information quantity. Therefore, where the apparatus of the invention is applied to a machine, such as a karaoke (sing-along) machine, in which the color and character frames of captions are varied dynamically in time in accordance with the timing of a song, more software (songs) can be stored in a recording medium (for instance, a CD). Where a karaoke machine receives software (a song) from a center facility via, for instance, a telephone line, the information quantity can be reduced, to thereby decrease the communication cost.

Although the above description is directed to the case where a caption is represented by only the caption data (wide sense) or by the caption data (wide sense) and the color data representing a color rectangular region, it may be constituted of only the color data.

To represent a caption by only the color data, the color data as the address for the CLUT 32 is produced in the coding apparatus of FIG. 1 so that the CLUT 32 outputs color region data having a pattern of characters of the caption (character-shaped region data of luminance data Y and color difference data Cb and Cr). In this case, in the caption decoding device 7, the operation of the pattern decoder 100 is stopped while the color data is decoded by the color decoder 101 as described above in connection with FIG. 7.

Also in this case, since the color data takes the same value (address) when a caption is to be displayed by a certain single color, the information quantity can be reduced by using the run-length coding. Where this type of apparatus is applied to an apparatus, such as a reproduction apparatus of movie software, which simply displays colored captions (that is, need not display captions that vary dynamically in time), the only change needed is to remove the pattern decoder 100. Thus, the apparatus can be constructed at a low cost.

Figure 11A:
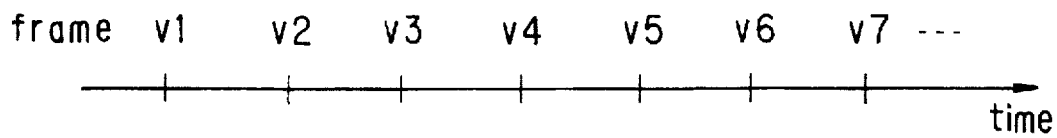
FIGS. 11(a) and 11(b) illustrate decode timings to scroll page-unit captions.
Figure 11B:
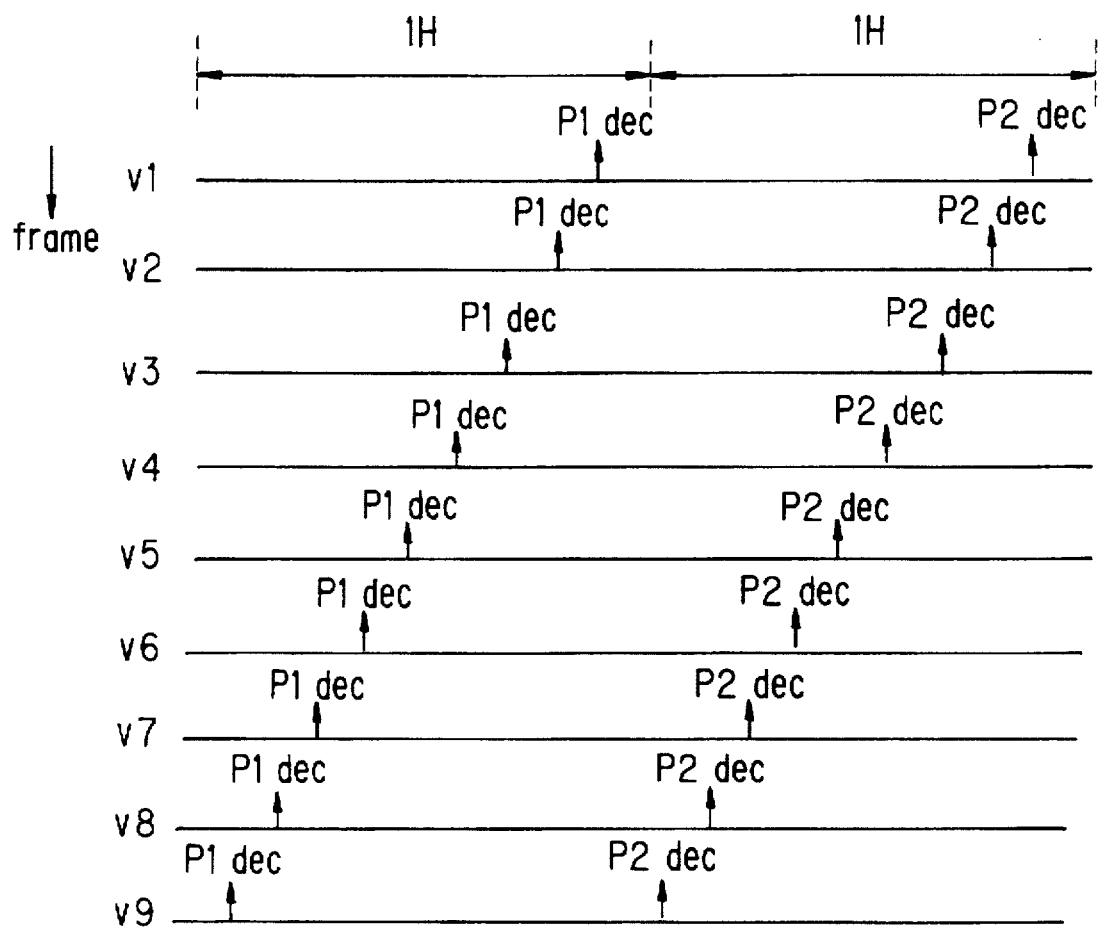

Further, in this case, by producing the color data so that character frames are attached which have an intermediate color between colors of a caption and a background video image, legible captions can be provided.

Where a caption is represented by only the caption data (wide sense), i.e., the caption data (narrow sense) and the key data, or the color data, it becomes possible to scroll captions whose data are transmitted in a packet form on a page-by-page basis by constituting the caption decoding device 7 by using two decoders (pattern decoder 100 and color decoder 101 in FIG. 7) and controlling the decode start timings of the decoders. For example, to scroll a first-page caption P1 and a second-page caption P2, which are superimposed, over frames v1, v2, .... of a video image as shown in FIG. 11(a), the decode start timings of the captions P1 and P2 of the two consecutive pages may be controlled as shown in FIG. 11(b). FIG. 11(b) shows the decode start timings of the captions P1 and P2 on a certain horizontal scanning line (1H) for displaying those captions.

More specifically, in frame v1, the data of the caption P1 is decoded at a timing that is much delayed from the timing of a horizontal sync signal of 1H for displaying it (i.e., at a timing located at an end portion of the 1H). In frame v2, the data of the caption P1 is decoded at a timing that is a little earlier than the timing in frame v1. In frame v3, the data of the caption P1 is decoded at a timing that is a little earlier than the timing in frame v2.

In frame v1, data of caption P1 is decoded at a timing much delayed from a timing of a horizontal sync signal of 1H for displaying it, i.e., at a timing located close to the end of the 1H. In frame v2, the data of caption P1 is decoded at a timing a little earlier than the timing in frame v1. In frame v3, the data of caption P1 is decoded at a timing a little earlier than the timing in frame v2. Data of caption data P2 of a page following the page of caption P1 is decoded at a timing delayed by 1H from the timing of decoding the data of caption P1.

In frame v4 onward, the data of the caption P1 is decoded is sequentially decoded with a prescribed delay from the timing of a horizontal sync signal of a horizontal scanning line for displaying it. As a result, the page-unit caption P1 can be scrolled right to left on a screen as shown in FIG. 12(b) over frames v1, v2, ...

Figure 12A:
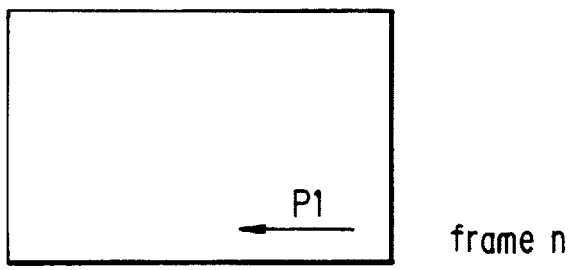
FIGS. 12(a)–12(c) illustrate how captions P1 and P2 of consecutive pages are scrolled.
Figure 12B:
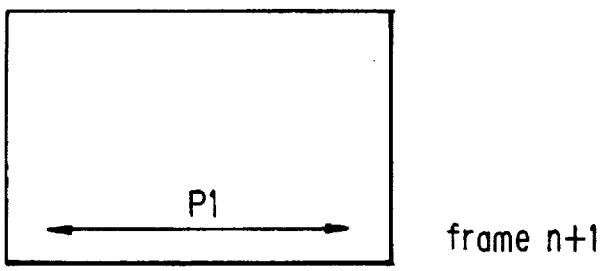

FIG. 11(b) shows a case of controlling the decode start timings of the caption P1 so that in frame v9 the entire caption P1 is displayed as shown in FIG. 12(a).

Then, the data of the caption P1 is decoded at timings progressively earlier than a horizontal sync signal of 1H for displaying it. As a result, the caption P1 is scrolled so as to move toward the left side of the screen and finally disappear.

Figure 12C:
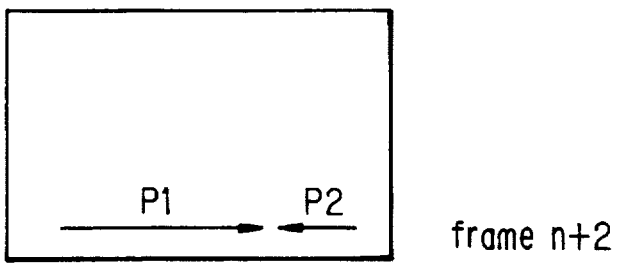

On the other hand, as shown in FIG. 11(b), the data of the second-page caption P2 next to the caption P1 is decoded with a 1H-delay from the timing of decoding the data of the caption P1. As a result, as shown in FIG. 12(c), the caption P2 is scrolled right to left on the screen following the caption P1.

Where the caption decoding device 7 has two decoders, it is possible to cause the respective decoders to decode the captions P1 and P2 at the above-described timings, to thereby enable scrolling of page-unit captions.

FIG. 13(a) and 13(b) show an example of a configuration of the caption decoding device for decoding captions by controlling the decode start timings in the above manner. In the figures, the parts corresponding to those in FIG. 7 are given the same reference numerals, and the word detecting circuit 20, schedulers 21 and 28, mixer 34 and controller 35 in FIG. 7 are omitted. Further, in FIGS. 13(a) and 13(b), the variable length decoding circuit 23, inverse run-length circuit 24 and 3:4 filter 25 and inverse decoding circuit 26 are shown as a decoder 111, and the variable length decoding circuit 29, inverse run-length circuit 30, 3:4 filter 31 and CLUT 32 are shown as a decoder 112.

Therefore, the caption decoding device of FIGS. 13(a) and 13(b) are constituted in the same manner as the caption decoding device 7 of FIG. 7 except that a selector 113 is substituted for the computing unit 33.

Where a caption is represented by only the caption data (wide sense), the decoder 112 is provided, in place of the CLUT 32, with an inverse quantizing circuit having the same configuration as the inverse quantizing circuit 26.

Therefore, the caption data is decoded in the above manner in each of the decoders 111 and 112. Where a caption is represented by only the color data, the decoder 111 is provided, in place of the inverse quantizing circuit 26, a CLUT having the same configuration as the CLUT 32. Therefore, the color data is decoded in the above manner in each of the decoders 111 and 112.

In the following description; the caption data (wide sense) and the color data are referred to as caption codes where appropriate.

Each of the code buffers 22 and 28 has two banks each capable of storing 1-page caption codes. More specifically, the code buffer 22 consists of banks A and C, and the code buffer 28 consists of banks B and D, where each of banks A-D can store 1-page caption codes.

Caption codes sent from the word detecting circuit 20 are written to the code buffers 22 and 28 on a page-by-page basis, for instance, in the order of bank A, B, C, D, A, .Caption codes stored in banks A and C are read by the decoder 111. In this case, while caption codes are read from one of banks A and C, caption codes are written to the other bank from the word detecting circuit 20. Similarly, while caption codes are read from one of banks B and D, caption codes are written to the other bank from the word detecting circuit 20.

That is, caption codes of consecutive pages p and p+1 are sequentially written to banks A and B, respectively. While those codes are read as shown in FIG. 13(a), caption codes of page p+2 are written to bank C. After caption scrolling using the caption codes of page p stored in bank A is finished, reading of the caption codes of page p+2 stored in bank C is started (at this time, the caption codes of page p+1 are read from bank B). At the same time, caption code of page p+3 are written to band D. After caption scrolling using the caption codes of page p+1 stored in bank B is finished, reading of the caption codes of page p+3 stored in bank D is started (at this time, the caption codes of page p+2 are read from bank C). At the same time, caption codes of page p+4 are written to bank A. The management of writing and reading caption codes to and from the code buffers 22 and 28 is performed by the controller 35 via the schedulers 21 and 27.

Referring to a timing chart of FIG. 14, an operation of the controller 35 will be described. FIG. 14 shows waveforms of respective signals for certain 1H ("scan line period"; see FIG. 14(a)) for displaying (superimposing) captions P1 and P2 of consecutive pages while scrolling those.

The following description is directed to a case of scrolling captions P1 and P2 over frames n to n+2. It is assumed that caption codes corresponding to captions P1 and P2 have already been stored in banks A and B, respectively. In frame n, a "display enable" signal (see FIG. 14(b)) is set at the L level in a period during which caption P1 is to be displayed.

The "display enable" signal, which is input to the decoders 111 and 112 from the controller 35, is an active-low signal, for instance; that is, it is set at the L level only in a period during which a caption is to be superimposed and at the H level in the other period. The decoders 111 and 112 performs decoding operations in accordance with timings of the "display enable" signal.

Further, the controller 35 supplies the decoder 111 with a "decode start" pulse (see FIG. 14(c)) at a timing of displaying caption P1 which timing is delayed from a horizontal sync ("H sync") signal by a prescribed period (in this case, at a timing delayed from the horizontal sync signal of the first 1H shown in FIG. 14(a) and close to the end of the 1H). Upon reception of the "decode start" pulse, the decoder 111 reads caption codes from bank A, decodes those codes, and supplies the decoded codes to the selector 113. In this case, the decoder 111 supplies a decoded result of a head portion of caption P1 to the selector 113 in a period during which an end portion of the 1H is to be displayed.

As described above, the controller 35 supplies a "decode start" pulse to the decoder 112 at a timing delayed by 1H from the timing of supplying the "decode start" pulse (see FIG. 14(c)) to the decoder 111. Upon reception of the "decode start" pulse, the decoder 112 reads caption codes from bank B, decode those codes, and supplies the decoded codes to the selector 113.

A "select" signal (see FIG. 14(f)) is supplied from the controller 35 to the selector 113. For example, the selector 113 selects the output of the decoder 111 when the "select" signal is at the H level and the output of the decoder 112 when it is at the L level, and supplies the selected codes to the mixer 34. In frame n, in which only caption P1 is displayed, a H-level "select" signal is input to the selector 113.

Therefore, in the display period of frame n, the selector 113 supplies the coded output of the decoder 111, i.e., the codes of caption P1 to the mixer 34. In the mixer 34, the head portion of caption P1 is superimposed on a video image in the end portion of the 1H (see FIG. 14(g)).

A "decode enable" signal (see FIG. 14(e)), which is supplied from the controller 35 to the decoders 111 and 112, is in the enable state over, for instance, the entire effective scanning line period of 1H when a caption is superimposed. The "decode enable" signal is an active-low signal, for instance.

Then, in frame n+1, the "display enable" signal (see FIG. 14(b)) is set at the L level during the effective scanning line period of the 1H. A "decode start" pulse (see FIG. 14(c)) is input to the decoder 111 at a timing of displaying caption P1 which timing is delayed from a horizontal scanning signal ("H sync") by a prescribed period (in this case, at a timing somewhat delayed from the horizontal sync signal of the second 1H shown in FIG. 14(a) and close to the start of the 1H). Upon reception of the "decode start" pulse, the decoder 111 again reads the caption codes from bank A, decodes those codes, and supplies the decoded codes to the selector 113. Therefore, the decoder 111 supplies the selector 113 with a decoded result of all of caption P1 over the almost entire period of the 1H. The decoder 112 decodes the caption codes stored in bank B at a timing delayed by 1H from the decoding timing of the decoder 111, and supplies the decoded result, i.e., the codes of caption P2 to the selector 113.

In displaying frame n+1, as in the case of displaying frame n, a H-level "select" signal (see FIG. 14(f)) is input to the selector 113 over the 1H period. Therefore, in the display period of frame n+1, the selector 113 supplies the coded result of the decoder 111, i.e., the codes of caption P1 to the mixer 34. In the mixer 34, all of caption P1 is superimposed on a video image over the entire 1H (see FIG. 14(g)).

As described above, on frames n and n+1, superimposed caption P1 is scrolled right to left on a screen.

In frame n+2, a "decode start" pulse is supplied to the decoder 111 at a timing somewhat earlier than the timing of a horizontal scanning signal of the third 1H shown in FIG. 14(a). In FIG. 14(c), the above "decode start" signal is indicated by a dashed line as a pulse being delayed therefrom by 1H. In response, the decoder 111 supplies the selector 113 with a decoded result of the latter half of caption P1 (from a position close to the head of caption P1 to its end) in the former half of the 1H (from the head of the effective scanning line period to a timing close to its end) in the same manner as in the above-described case.

Further, in frame n+2, the "display enable" signal (see FIG. 14(b)) is set at the L level during the effective scanning line period of the third 1H shown in FIG. 14(a). A "decode start" pulse (see FIG. 14(d)) is input to the decoder 112 at a timing (indicated by a dashed line in FIG. 14(c)) delayed by 1H from the timing at which the "decode start" pulse is supplied to the decoder 111 (in this case, at a timing close to the end of the 1H). Upon reception of the "decode start" pulse (see FIG. 14(d)), the decoder 112 reads the caption codes from bank B, decodes those codes, and supplies the decoded codes to the selector 113. Therefore, the decoder 112 supplies the selector 113 with a decoded result of a head portion of caption P2 during the latter half of the 1H (an end portion of the effective scanning line period).

In displaying frame n+2, the level of the "select" signal (see FIG. 14(f)) that is input to the selector 113 is switched at a prescribed timing in the 1H. In this case, a H-level "select" signal is input to the selector 113 during the former half of the 1H. The "select" signal is changed from the H level to the L level at the timing when the "decode start" pulse (see FIG. 14(d)) is supplied to the decoder 112.

Therefore, the selector 113 selects the decoded output of the decoder 111 during the former half of the 1H shown in FIG. 14(a), and the decoded output of the decoder 112 during the latter half.

As a result, during the display period of frame n+2, the mixer 34 superimposes the latter half of caption P1 on the former half of the 1H of a video image, and the head portion of caption P2 on the latter half of the 1H of the video image, as shown in FIG. 14(g).

With the above operation, over frames n+1 and n+2, caption P1 is scrolled from right to left on the screen while caption P2 is also scrolled from right to left following caption P1.

If there exists caption P3 of a page following the page of caption P2, caption codes of caption P3 are written to bank C of the code buffer 22 while the decoding operation on caption P1 is performed in the above manner. After the scrolling of caption P1 is finished, the decoder 111 starts to decode the caption codes stored in bank C. Thus, scrolling of caption P3 is performed following the scrolling of caption P2 in the same manner as in the scrolling of captions P1 and P2.

Figure 15A:
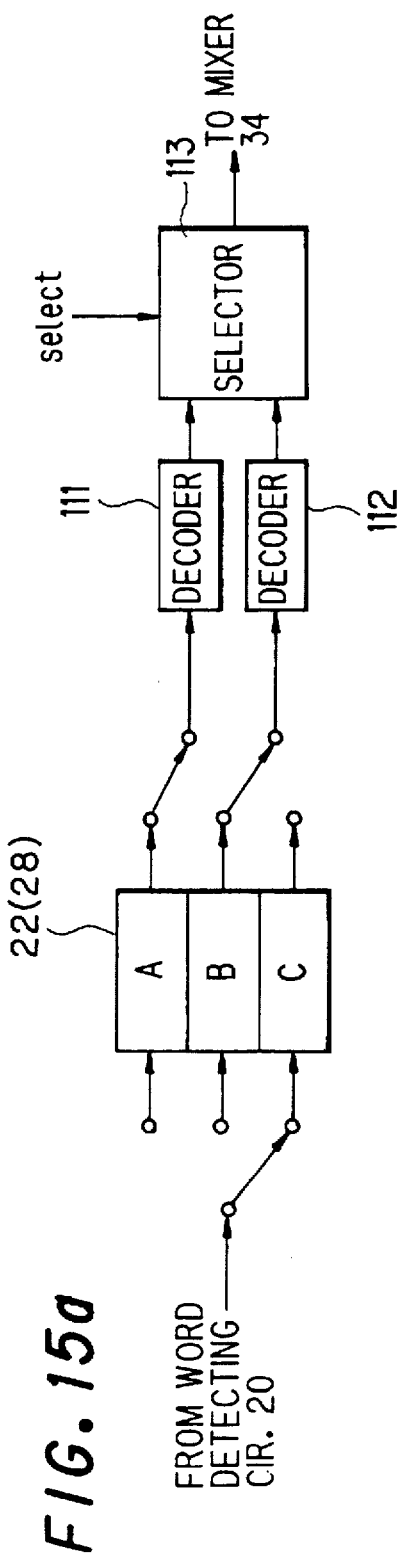
FIGS. 15(b) and 15(b) are block diagrams showing a configuration of a second embodiment of the caption decoding device according to the invention.
Figure 15B:
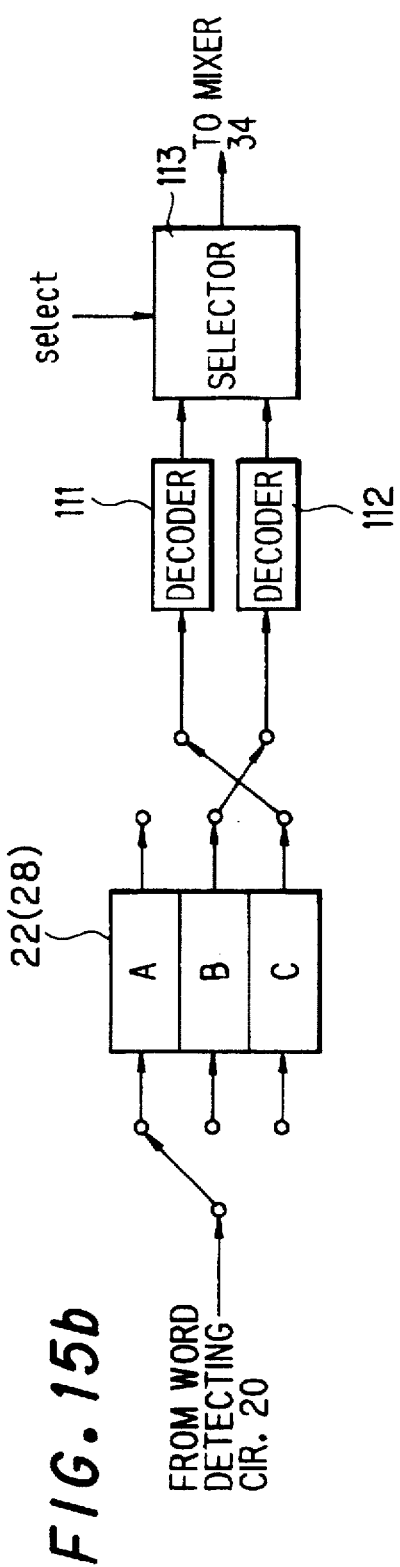
Figure 17:
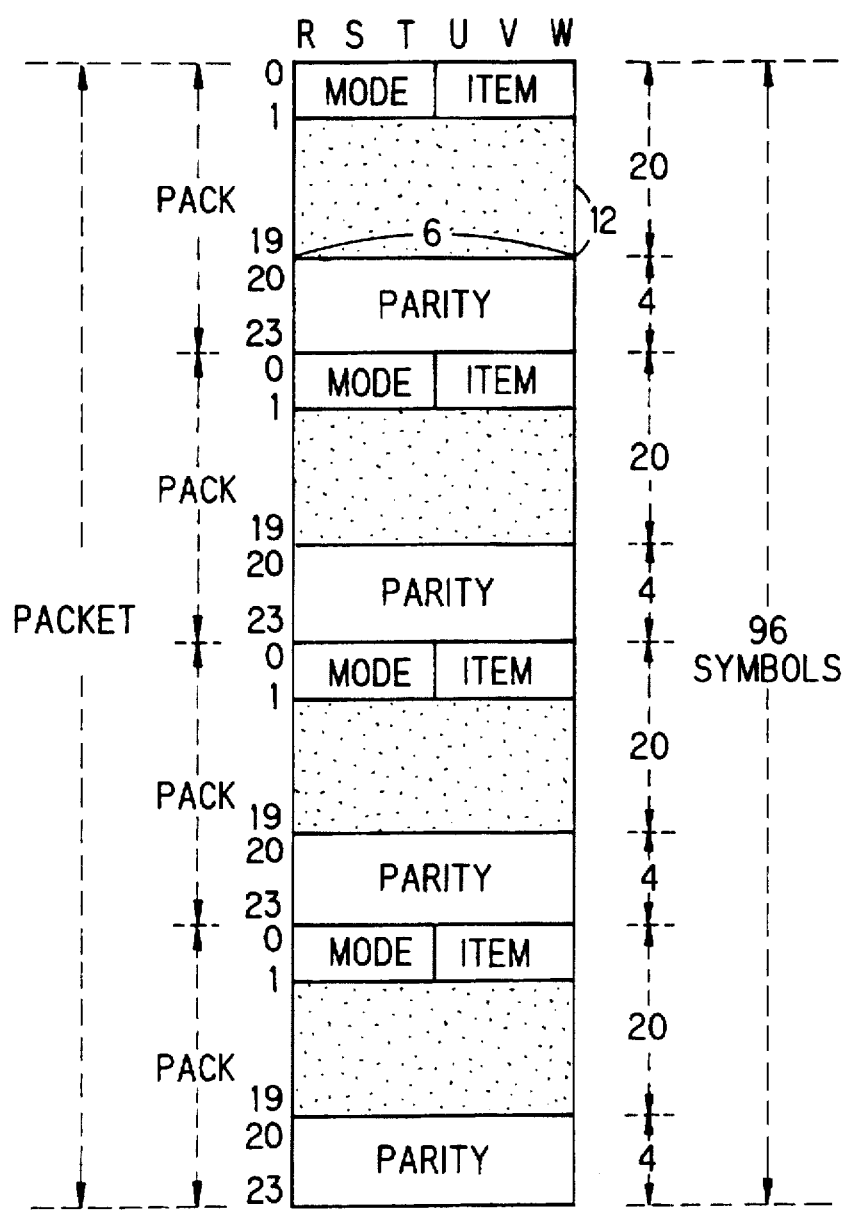
FIG. 17 illustrates a conventional transmission format of subcodes.

FIGS. 15(a) and 15(b) show another example of a configuration of the caption decoding device for scrolling captions. In FIGS. 15(a) and 15(b), the parts corresponding to those in FIG. 13(a) and 13(b) are given the same reference numerals. This caption decoding device is constituted in the same manner as that of FIGS. 13(a) and 13(b) except that one of the code buffers 22 and 28 is removed, and that one of the schedulers 21 and 27 corresponding to the removed code buffer is also removed.

The single code buffer 22 (or 28) is equipped with three banks each having a capacity large enough to store 1-page caption codes. More specifically, the code buffer 22 consists of banks A, B and C each capable of storing 1-page caption codes.

Caption codes of consecutive pages sent from the word detecting circuit 20 are written to the code buffer 22 in the order of bank A, B, C, A . . . , for instance. As shown in FIG. 15(a), the caption codes stored in banks A and B of the code buffer 22 are read and decoded by the decoders 111 and 112, respectively at the same timing as in the case of FIG. 13(a). During this operation, caption codes of a page next to the page of the caption codes stored in bank B are written to bank C as shown in FIG. 15(a). After completion of the operation on the caption codes stored in bank A (after a caption corresponding to the caption codes stored in bank A is scrolled and disappears from the screen), the caption codes stored in bank C are read and decoded as shown in FIG. 15(b). During this operation, caption codes of a page next to the page of the caption codes stored in bank C are written to bank A as shown in FIG. 15(b). After completion of the operation on the caption codes stored in bank B, the decoder 112 reads and decodes the caption codes stored in bank A.

The management of writing and reading the caption codes to and from the code buffer 22 (or 28) is performed by the controller 35 via the scheduler 21 (or 27).

Therefore, also in this configuration, captions can be scrolled using caption codes that are sent on a page-by-page basis, as in the case of FIGS. 13(a) and 13(b).

Where there are provided two memories (code buffers 22 and 28) each consisting of two banks as in the case of FIGS. 13(a) and 13(b), caption codes may be read at a speed depending on a display rate, i.e., the ordinary speed that is the same as the speed of not performing scrolling. On the other hand, where there is provided only one memory (code buffer 22 (or 28)) consisting of three banks as in the case of FIGS. 15(a) and 15(b), it is necessary to read caption codes at a speed two times higher than the ordinary speed. The reading of caption codes at the double-speed rate may be performed, for instance, complementarily between two banks (two of banks A-C from which the decoders 111 and 112 are reading caption codes) on a clock-by-clock basis.

While in the above embodiment is directed to the case of horizontal scrolling, vertical scrolling can also be performed easily, for instance, by controlling decode start timings such that decoding is performed with prescribed delays from the vertical sync signal timing.

As described above, according to the caption data decoding device of the invention, each of caption data of consecutive two pages is decoded with a prescribed delay from the horizontal sync signal timing, and either of the two caption data is selected and output at a prescribed timing on a horizontal scanning line of a video image. Therefore, a caption can be scrolled by using only the caption data of each page, i.e., caption data of a small amount.

What is claimed is:

1. A caption data decoding device for decoding data of a caption to be displayed being superimposed on a video image, comprising:

separating means for separating the caption data from transmission data;

storing means including at least three banks, for temporarily storing the caption data sequentially output from the separating means;

first and second decoding means for decoding the caption data stored in the storing means and generating separate decoded outputs; and selecting means for selecting and outputting either of the decoded outputs of the first and second decoding means, wherein the storing means sequentially stores the caption data supplied from the separating means into the respective banks on a page-by-page basis;

wherein the first and second decoding means read and decode respective caption data of two consecutive pages of the caption data stored in the storing means at a timing delayed by a prescribed period from a horizontal sync signal timing of the video image; and wherein the selecting means switches decoded caption data to be output at a prescribed timing in one horizontal scanning line period of the video image.

2. A caption data decoding device for decoding data of a caption to be displayed being superimposed on a video image, comprising:

separating means for separating the caption data from transmission data;

first and second storing means each including two banks, for temporarily storing the caption data sequentially output from the separating means;

first and second decoding means for decoding the caption data stored in the first and second storing means, respectively, and producing separate decoded outputs; and selecting means for selecting and outputting either of the decoded outputs of the first and second decoding means, wherein the first and second storing means alternately stores the caption data supplied from the separating means on a page-by-page basis;

wherein the first and second decoding means read and decode respective caption data of two consecutive pages of the caption data stored in the first and second storing means at a timing delayed by a prescribed period from a horizontal sync signal timing of the video image; and wherein the selecting means switches decoded caption data to be output at a prescribed timing in one horizontal scanning line period of the video image.

3. A caption data decoding device comprising:

a receiver for receiving an input signal comprised of video transmission data, caption data and timing data;

separator circuitry for separating said caption data from said video transmission data and timing data and sequentially outputting the separated caption data;

storage means for storing said caption data output from said separating means;

first and second decoders for decoding said caption data;

an output circuit for selectively outputting said decoded caption data from said first and second decoders in synchronization with a horizontal sync signal and including means for alternately outputting said decoded caption data from said first decoder and said second decoder in synchronization with said horizontal sync signal.

4. A caption data decoding device according to claim 3 wherein said storage means comprises three banks of storage area.

5. A caption data decoding device comprising:

receiving means for receiving an input signal comprised of video transmission date, caption date and timing data, including a horizontal sync signal;

separating means for separating said caption data from said video transmission data;

storage means comprising three banks of storage area for temporarily storing said caption data output from said separating means further including means for sequentially storing said caption data into said three banks of storage area on a page by page basis;

first and second decoding means for reading out and decoding said caption data stored in said storage means at a predetermined time period after the occurrence of said horizontal sync signal; and selecting means for selectively outputting said decoded caption data from said first and second storage means during one horizontal scanning line period as defined by said horizontal sync signal.

6. A caption data decoding device comprising:

an input circuit for receiving an input signal comprised of video data, caption data and timing data which includes a horizontal sync signal;

separating circuitry for separating said caption data from said input signal;

first and second storage memories for temporarily storing said caption data;

said first and second storage memories each including two banks of storage area for storing said caption data;

first and second decoders for decoding said caption data stored in said first and second storage memories;

selecting circuitry for selectively outputting decoded caption data from said first and second decoders in sync with said horizontal sync signal and including means for outputting said decoded caption data corresponding to one horizontal scanning period.

* * * * *

UNITED STATES PATENT AND TRADEMARK OFFICE
CERTIFICATE OF CORRECTION

PATENT NO.: 5,742,352
DATED: April 21, 1998
INVENTOR(S): IKUO TSUKAGOSHI

It is certified that error appears in the above-identified patent and that said Letters Patent is hereby corrected as shown below:

At Col. 28, line 7, please insert -- , -- between the words "signal" and "and".

Signed and Sealed this

Twenty-fifth Day of August, 1998

Attest:

BRUCE LEHMAN

Attesting Officer

Commissioner of Patents and Trademarks